(12) United States Patent
Lorenzi et al.

(10) Patent No.: US 12,397,538 B2
(45) Date of Patent: Aug. 26, 2025

(54) MACHINE FOR PROCESSING A WEB MATERIAL WITH A THREADING DEVICE AND RELATIVE METHODS

(71) Applicant: Korber Tissue S.p.A., Lucca (IT)

(72) Inventors: Fabrizio Lorenzi, Lucca (IT); Stefano Silvestri, Lucca (IT); Leonardo Boschi, Lucca (IT); Emanuele Andreuccetti, Lucca (IT); Riccardo Giorgi, Lucca (IT); Massimiliano Adalberti, Lucca (IT); Jury Palazzesi, Lucca (IT); Luigi Fabbri, Lucca (IT)

(73) Assignee: Korber Tissue S.p.A., Lucca (IT)

( * ) Notice: Subject to any disclaimer, the term of this patent is extended or adjusted under 35 U.S.C. 154(b) by 432 days.

(21) Appl. No.: 18/018,081

(22) PCT Filed: Jul. 22, 2021

(86) PCT No.: PCT/EP2021/070565
§ 371 (c)(1),
(2) Date: Jan. 26, 2023

(87) PCT Pub. No.: WO2022/023172
PCT Pub. Date: Feb. 3, 2022

(65) Prior Publication Data
US 2023/0303355 A1    Sep. 28, 2023

(30) Foreign Application Priority Data

Jul. 27, 2020 (IT) .................. 102020000018088

(51) Int. Cl.
*B32B 38/06*   (2006.01)
*B31F 1/07*    (2006.01)
*B32B 38/00*   (2006.01)
*B41F 13/03*   (2006.01)

(52) U.S. Cl.
CPC .............. *B32B 38/06* (2013.01); *B31F 1/07* (2013.01); *B32B 2038/0028* (2013.01); *B41F 13/03* (2013.01)

(58) Field of Classification Search
CPC ... B32B 38/06; B32B 2038/0028; B31F 1/07; B41F 13/03; B65H 20/20; B65H 2301/5126; B65H 2301/522; B65H 2404/262; B65H 2407/10; B65H 2408/235; B65H 2701/1924
See application file for complete search history.

(56) References Cited

U.S. PATENT DOCUMENTS 4,111,122 A * 9/1978 Kutzner ............. B41F 13/03
                                                101/228
5,307,970 A * 5/1994 Shibuya ............ B41F 13/03
                                                101/228

FOREIGN PATENT DOCUMENTS

DE      10152523 A1   5/2003
DE   102006007178 B3   7/2007
(Continued)

*Primary Examiner* — George R Koch
*Assistant Examiner* — Christopher C Caillouet
(74) *Attorney, Agent, or Firm* — Breiner & Breiner, L.L.C.

(57) ABSTRACT

In order to thread a web material in a converting machine a system is provided, with a first continuous flexible member and a second flexible member. An anchoring element, to which there can be fixed the web material leading edge, may be transferred from one to the other of the two flexible members so as to facilitate the threading operations.

27 Claims, 28 Drawing Sheets

(56) References Cited

FOREIGN PATENT DOCUMENTS

EP          1232860  A1    8/2002
WO       2018092167  A1    5/2018

* cited by examiner

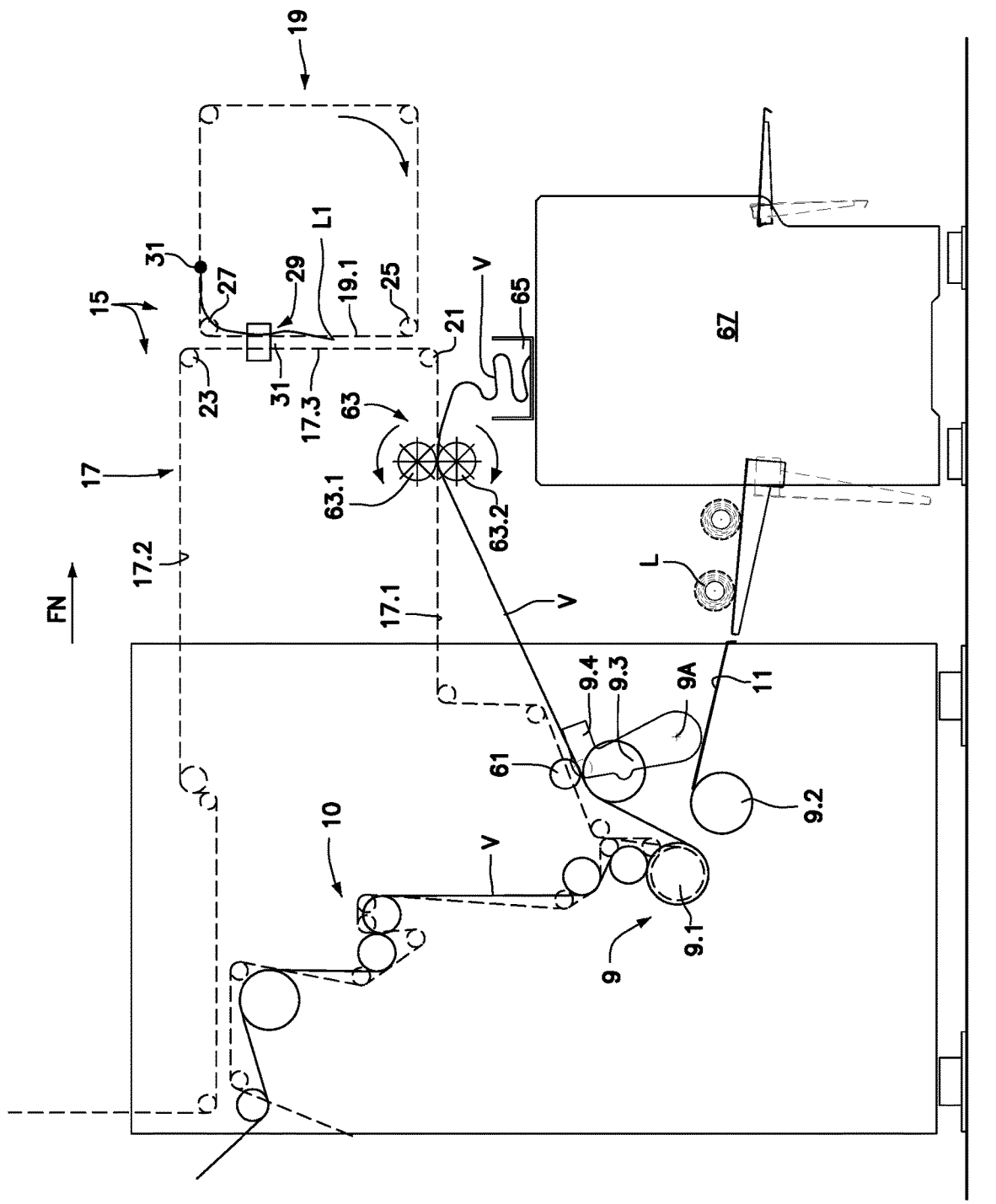

MACHINE FOR PROCESSING A WEB MATERIAL WITH A THREADING DEVICE AND RELATIVE METHODS

TECHNICAL FIELD

Disclosed herein are improvements to a line for converting a web material and relative methods. Described embodiments relate to improvements to systems for threading web material in the converting line and in particular in the winding unit of a rewinder arranged in the converting line.

BACKGROUND ART

In line for converting a web material there arises the need to introduce the leading edge of the web material in the path along the converting line, whenever converting of a new material shall start. The operation of introducing the leading edge of the web material is referred to in the industry as "threading".

Typically, threading operations are required in the paper converting industry, for example tissue paper for manufacturing paper rolls. Threading operations are required when the web material breaks inadvertently, or when the parent reel of the web material finishes and has to be replaced with another parent reel and the line does not provide systems for joining the trailing edge of the web material of the finishing reel with the leading edge of the web material of a new reel.

In some cases, the web material consists of two or more plies, which can be supplied from one or more parent reels. In this case, when the threading is to be carried out it is done separately for the two plies, given that the converting line normally has different paths for the two plies.

Various devices have been provided to facilitate threading. WO-2018092167 for example discloses a threading device, wherein a continuous belt is provided, which follows the threading path between the inlet of a rewinder and the winding unit of the rewinder. The belt is configured so that a leading edge of the web material can be anchored thereto. The belt is driven along the closed path up to a pair of rollers which form a nip. The initial portion of the web material, whose head is anchored to the belt, is inserted into the nip between the two rollers. A blade, which is arranged downstream of the nip and adjacent to the belt, cuts the initial edge of the web material, separating it from the belt while the web material advances due to traction exerted by the belt. The blade is arranged along the path of the belt, so that the web material anchored to the belt passes between the blade and one of the two rollers. The blade co-acts with a counter-blade formed on the roller.

In order to carry out the threading of two plies, WO2018092167 discloses a configuration, wherein the arrangement of belt and blade is doubled: a belt and a blade are provided for each ply, the belt and the blade being arranged on opposite sides of the threading path. This entails an increase in cost and a significant complication on the rewinding machine, even due to the fact that the threading belts, present on both sides in this case, hinder access to other parts of the machine. Furthermore, the disclosed system does not allow to carry out the threading of more than two plies.

These and other known threading systems require that the leading portion of the web material be drawn outside the useful width of the converting line.

Therefore, it would be advantageous to provide a threading system capable of fully or partly overcoming one or more of the drawbacks of the threading systems of the prior art.

In some devices of the prior art, the operator has to intervene to insert the web material by hand into the nip formed by a pair of rollers of the converting line, thus entailing considerable risks of accidents by crushing. In an attempt to minimise these accidents, there usually are complex safety procedures which complicate the converting line and significantly increase the time required to thread the web material along the entire converting line.

It would be useful to provide an automatic threading system that allows to fully or partly resolve one or more of the drawbacks of the threading devices of the prior art.

SUMMARY OF THE INVENTION

According to an aspect, disclosed herein is a machine for converting a web material, comprising: a web material advancement path and a threading device adapted to introduce a leading edge of the web material into the web material advancement path. The machine may be a rewinding machine, or an embossing-laminating machine, a printing machine or another machine for processing or converting a web material.

The web material may be a single-ply or multi-ply web material.

According to embodiments disclosed herein, the threading device comprises a first continuous flexible member defining: a threading path from an upstream position to a downstream position with respect to the threading direction of the web material, and a return path; and a second flexible member. The second flexible member may be a continuous flexible member, but in some embodiments, it may consist of a non-continuous flexible member, i.e. provided with open ends.

The machine further comprises at least one web material anchoring element, which can be reversibly constrained alternately to the first flexible member and to the second flexible member. A device for transferring the anchoring element from the first flexible member to the second flexible member is arranged in a transfer position along a portion of the path of the first flexible member, in said position the first flexible member being adjacent to the second flexible member. The transfer device serves to transfer the anchoring element from one to the other of the two flexible members, to carry out at least one step of the threading process.

The aforementioned machine may be a rewinder arranged in a web-line converting line, comprising, upstream of the rewinding machine, an embossing-laminating machine. The embossing-laminating machine may comprise: a first inlet for a first ply of the web material; a second inlet for a second ply of the web material; an outlet for first ply and the second ply.

In an embodiment, the first continuous flexible member extends from the first inlet of the embossing-laminating machine towards the rewinder. A third flexible member extends from the second inlet to the outlet of the embossing-laminating machine. Arranged at the outlet of the embossing-laminating machine is a second device for transferring the anchoring element from the third flexible member to the first flexible member, which second device is positioned in a second transfer position along a portion of the path of the first flexible member, in said second transfer position the first flexible member being adjacent to the third flexible member. Then, the first flexible member extends to the rewinder.

In another embodiment, a fourth continuous flexible member extends from the first inlet of the embossing-laminating machine towards the rewinder. Arranged at the outlet of the embossing-laminating machine is a second device for transferring the anchoring element from the third flexible member to the fourth flexible member positioned in a second transfer position along a portion of the path of the fourth flexible member, in said second transfer position the first flexible member being adjacent to the third flexible member. Arranged between the outlet of the embossing-laminating machine and the winding unit of the rewinder is a third device for transferring the anchoring element from the fourth flexible member to the first flexible member, positioned in a third transfer position along a portion of the path of the fourth flexible member, in said third transfer position the fourth flexible member being adjacent to the first flexible member.

In order to facilitate the transfer of the anchoring element from one flexible member to the other, the anchoring element may comprise at least one coupling member adapted to reversibly couple the anchoring element alternately to one and to the other of the flexible members.

In some embodiments, the anchoring element comprises a sheet, with a first face and a second face, from which the coupling member projects. The laminar shape of the anchoring element facilitates the passing thereof through the machine along the threading path. In particular, the sheet may be made of plastic material. Advantageously, the sheet may have a very low thickness, typically not higher than 3 mm, preferably comprised between 0.3 and 1 mm, and generally a thickness such to be able to pass through the nips defined between rollers pressed one against the other, to pinch the web material.

In some embodiments, the coupling member comprises at least one stem and preferably two stems, each having two end expansions positioned on two opposite sides of the anchoring element, adapted to be engaged in shaped slots of the first flexible member and of the second flexible member. This embodiment is particularly advantageous as it facilitates the transfer of the anchoring element.

The possibility of providing coupling members of another type cannot be ruled out. For example, the anchoring element may be constrained to one or the other of the flexible members by means of a magnetic system. In other embodiments, coupling members of the snap type, bayonet type, screw type or other type can be provided, with devices adapted to deactivate and activate the coupling members.

As mentioned, the machine into which the threading device is inserted may be a rewinding machine, for example to produce rolls or logs of tissue paper. The rewinding machine comprises a winding unit arranged along the threading path upstream of the transfer position.

Further features and embodiments of the machine and of the threading device are described hereinafter and in the attached claims, which are an integral part of the present description.

According to a further aspect, disclosed herein are methods for threading a web material, or a ply, in a machine for converting or processing a web material.

In embodiments a method for threading a web material in a machine for processing a web material is provided, the method comprising the following steps:
  engaging a leading edge of a web material to an anchoring element which can be reversibly constrained to a first continuous flexible member, wherein the first continuous flexible member defines a threading path from a first upstream position to a second downstream position with respect to a web material advancement direction in the machine, and a return path;
  inserting the leading edge of the web material along the threading path, through the machine up to the second downstream position;
  transferring the anchoring element, with the web material anchored thereto, from the first flexible member to a second flexible member, in a transfer position, wherein a portion of the path of the first flexible member is arranged adjacent to a path of the second flexible member.

According to a further aspect, disclosed herein is a method for threading a web material in a rewinder comprising a winding unit, the method comprising the following steps:
  engaging a leading edge of a first ply of web material to an anchoring element which can be reversibly constrained to a first continuous flexible member, in which the continuous flexible member defines a threading path from an inlet of the rewinder up to a position downstream of the winding unit, with respect to the web material threading direction, and a return path;
  inserting the leading edge of the first ply along the threading path, through a winding unit, up to a transfer position moving the anchoring element by means of the first flexible member;
  transferring the anchoring element, with the first ply anchored thereto, from the first flexible member to a second flexible member, in a transfer position, wherein a portion of the path of the first flexible member is arranged adjacent to a path of the second flexible member;
  interrupting the first ply of web material to start winding a roll in the winding unit.

According to a further aspect, disclosed herein is a method for threading two plies of web material in an embossing-laminating machine, comprising the following steps:
  engaging a leading edge of a first ply of web material to a first anchoring element which can be reversibly constrained to a first flexible member, said first flexible member defining a threading path from a first inlet of the embossing-laminating machine to an outlet of the embossing-laminating machine;
  threading the leading edge of the first ply of web material from the first inlet to the outlet of the embossing-laminating machine through the first anchoring element constrained to the first flexible member;
  engaging a leading edge of a second ply of web material to a further anchoring element which can be reversibly constrained to a further flexible member, said further flexible member defining a threading path from a second inlet of the embossing-laminating machine to the outlet of the embossing-laminating machine;
  threading the leading edge of the second ply of web material from the second inlet to the outlet through the further anchoring element constrained to the further flexible member;
  transferring the further anchoring element from the further flexible member to the first flexible member;
  through the first flexible member, transferring the anchoring element and the further anchoring element, with the first ply and the second ply constrained thereto, towards a station downstream of the embossing-laminating machine.

Further embodiments of the method according to the invention will be described in detail hereinafter and are defined in the attached dependent claims.

BRIEF DESCRIPTION OF THE DRAWINGS

The invention will be clearer from the description and the attached drawings, which illustrate embodiments provided by way of non-limiting examples of the invention. More particularly, in the drawings:

FIGS. 4A-4H are steps of a threading sequence in an embodiment;

DETAILED DESCRIPTION

Described hereinafter is a converting line, i.e. a processing line for a web material, in particular for example tissue paper. In the illustrated embodiments the web material is a material comprising at least two plies, which is wound to produce rolls, but the possibility of using a web material comprising a single ply or more than two plies cannot be ruled out. In the illustrated converting line, an unwinder, an embossing-laminating machine and a rewinder are arranged in sequence. Threading devices, or threader devices, of the present invention are used for threading plies of the web material in the embossing-laminating machine and in the rewinder. In other embodiments, in the converting line several machines can be arranged upstream of the rewinder, one or more of which may use the same threading devices, or further threading devices for threading one or more plies forming the web material. In yet further embodiments the embossing-laminating machine may be omitted.

Generally, the line described hereinafter shows how one or more threading devices and relative methods of the present invention may be advantageously used for threading plies of web material in different machines and for different purposes, possibly arranged sequentially with respect to each other.

Hereinafter and in the attached claims reference will be made to a web material and to one or more plies that it consists of. As known to those skilled in the art, generally (for example for the production of tissue paper), the web material may consist of one or more plies which are bonded and processed together in each machine of the line. In other cases, several plies may be processed so as to at least partly follow separate paths, for example in an embossing-laminating machine. The threading devices may be used in the same machine or in the same line for threading a different number of plies depending on the type of product to be produced by the line. Thus, in the present description and in the attached claims in some cases reference shall be made to a web material while in other cases reference will be made to one or more plies of the web material. Unless specified otherwise, the expression "web material" is generally used to also indicate a single ply of a multi-ply of web material, or a single-ply web material.

Figure 1:
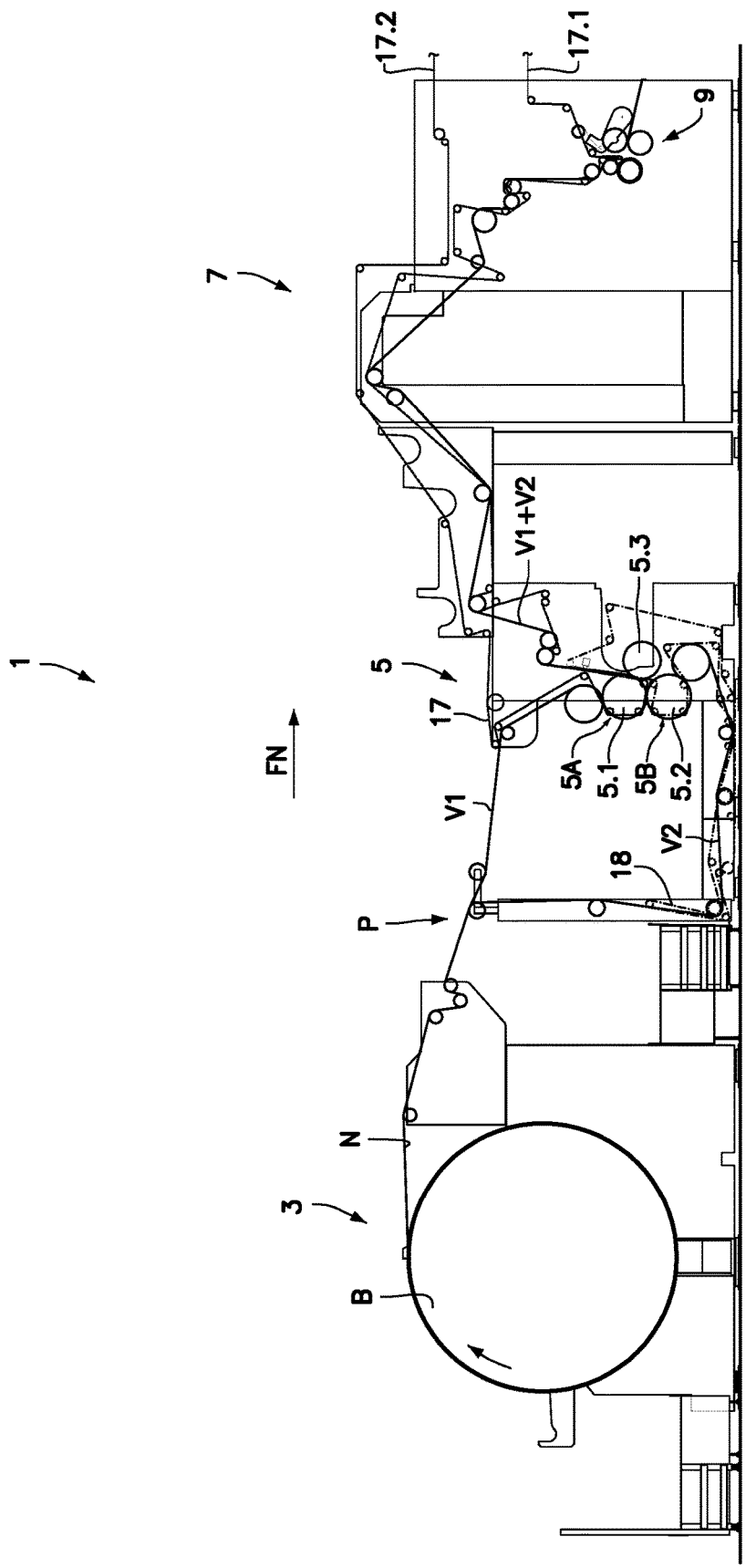
FIG. 1 is a side view of a line for converting a web material in an embodiment.
Figure 2:
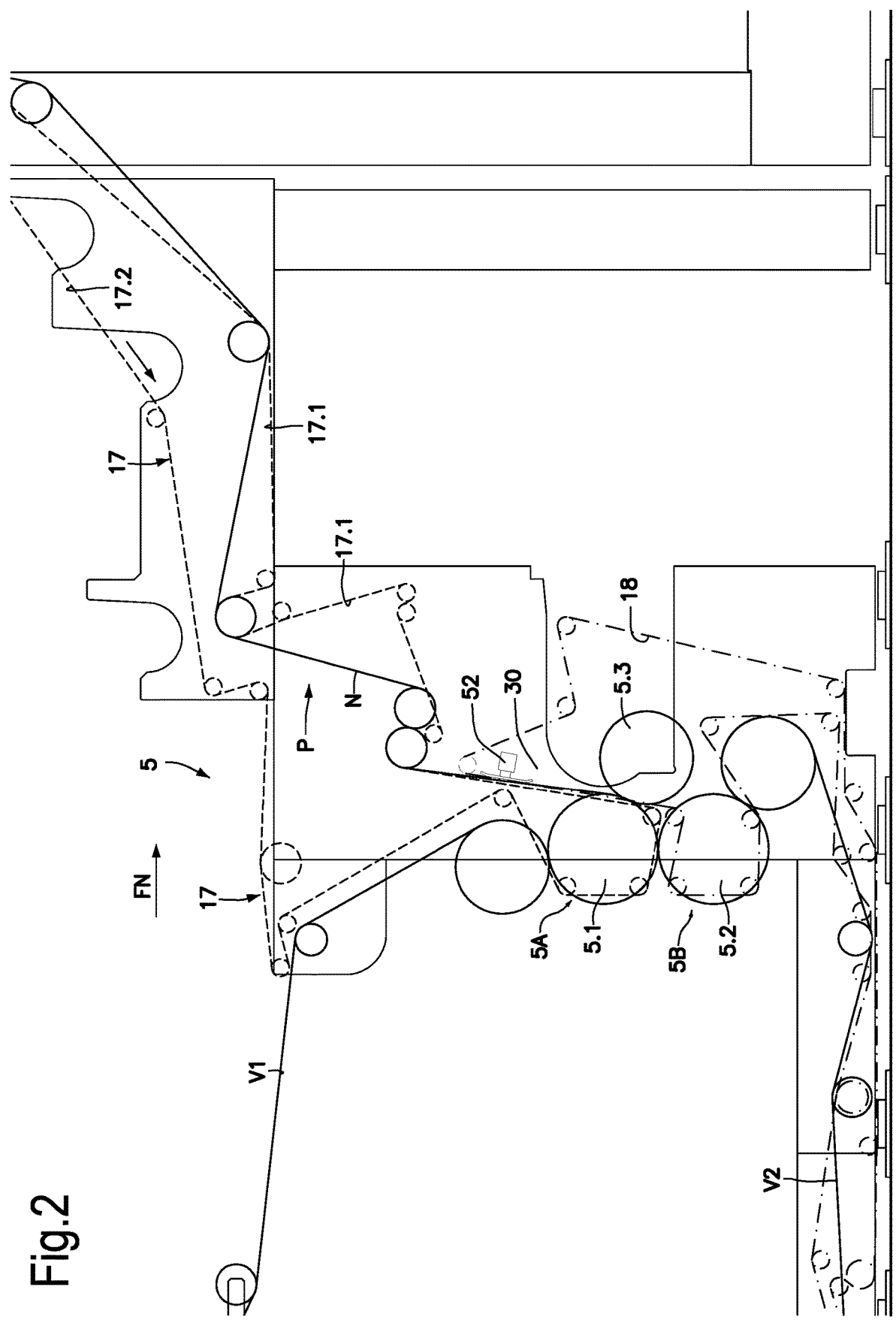
FIG. 2 is an enlargement of the line portion of FIG. 1 containing the embossing-laminating machine.
Figure 3:
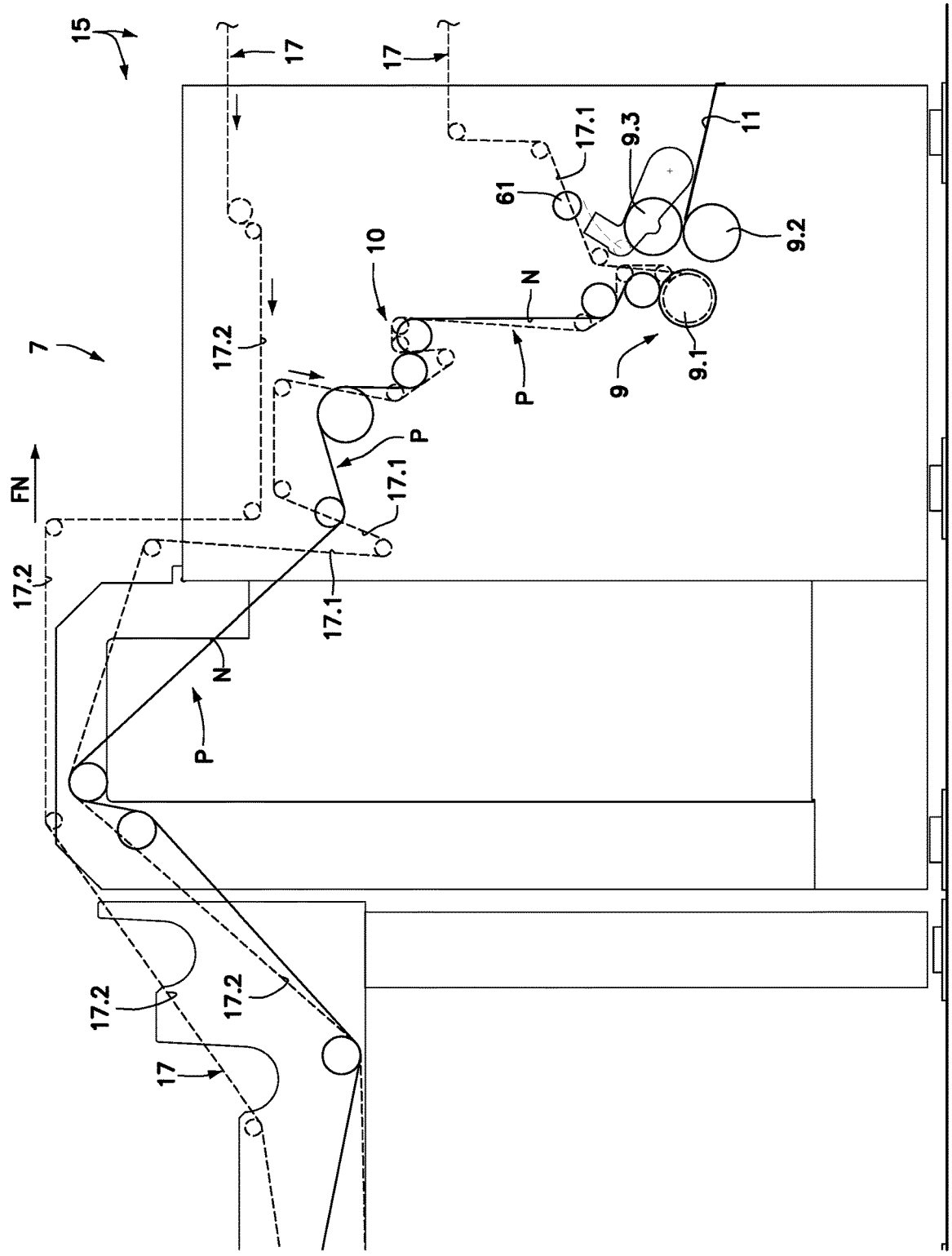
FIG. 3 is an enlargement of the line portion of FIG. 1 containing the rewinder.

Referring now to the attached drawings, FIGS. 1, 2, 3 show a line 1 for converting a web material, solely regarding the initial part thereof, of interest to the present description. In the illustrated example, the converting line is a line for converting parent reels of tissue paper made into rolls of tissue paper with size suitable for marketing. The converting line comprises further stations downstream of those illustrated in FIGS. 1 to 3, in particular for cutting the rolls to the desired axial length and for packaging. These further stations are known per se and they will not be described, as they are irrelevant to the illustration of the invention.

The converting line 1 comprises an unwinder 3 for unwinding parent reels B of web material. The web material of a parent reel B may consist of a single ply, or several plies, for example two plies, which are initially supplied along two separate paths, as described hereinafter. In other embodiments, not illustrated, the unwinder 3 may comprise several stations for unwinding more than one parent reel simultaneously or sequentially.

In FIG. 1 a web material which may consist of a single ply or several plies is generally indicated with N. Unless otherwise specified, the expression web material may be used to indicate both the complete web material, possibly consisting of several plies arranged side by side as well as a single ply intended to be possibly coupled to other plies to form a multi-ply web material.

A path for the web material is generally indicated with P.

Given that in the illustrated case the parent reel B contains two plies V1 and V2, the latter are separated in a point of the path P to advance according to two separate paths towards an embossing-laminating machine 5. The embossing-laminating machine 5 is known per se and will not be described in detail unless to the extent useful for a better understanding of the present invention. The embossing-laminating machine 5 comprises two embossing units 5A, 5B, which emboss—separately from each other—the two plies V1, V2 which are subsequently bonded to one another in a lamination nip and exit from an outlet of the embossing-laminating machine 5 bonded to each other, for example by gluing.

Thus, the embossing-laminating machine 5 comprises a first inlet for the ply V1, which is supplied to the first embossing unit 5A, and a second inlet for the ply V2, which is supplied to the second embossing unit 5B.

As described in greater detail hereinafter, in the illustrated embodiment the embossing-laminating machine 5 comprises a new threading system which allows to thread, i.e. to insert the leading edge of the plies V1 and V2 into the two inlets, through the two embossing units 5A, 5B and up to the outlet of the two plies V1, V2.

Arranged downstream of the embossing-laminating machine 5 is a rewinder 7, which winds the web material N into logs or rolls with a diameter equal to the diameter of the finished product and with an axial length equal to a multiple of the length of the finished rolls. Arranged downstream of the rewinder is a cutting device (not shown), which cuts the logs or rolls into individual small rolls which are packaged in a packaging station (not shown).

As indicated in FIG. 3, the rewinder 7 comprises a winding unit 9, to which the web material N is supplied along the path P so as to be wound into rolls. Upstream of the winding unit 9, along the path P of the web material N, a perforator 10 may be arranged, which generates transversal perforation lines along the web material, so as to divide the web material into individual sheets which can be separated by tearing one from the other at the time of use.

In some embodiments, the winding unit 9 may comprise peripheral winding members. As known to those skilled in the art, the expression peripheral winding is used to indicate a winding obtained by keeping a roll being formed in rotation by means of a plurality of motor-driven winding members, contacting the cylindrical surface of the roll and which transmit a rotational torque to the roll by friction. For example, the winding members may comprise a plurality of motor-driven belts and/or a plurality of winding rollers, as indicated with 9.1, 9.2 and 9.3 in FIG. 3.

Rolls formed in the rewinder 7 are supplied to the stations downstream, not shown, by means of a chute 11.

In order to introduce the web material into the converting line 1 at the beginning of the processing, or for example in the event of inadvertent breakage of the web material, a threading device is provided. In the illustrated embodiment, the threading device is adapted to introduce the web material through the embossing-laminating machine 5 and through the rewinder 7. Initially described hereinafter are members for threading the web material through the rewinder 7 and subsequently those for threading the web material through the embossing-laminating machine 5.

Generally, the threading device is used to insert all plies which form the web material one after the other.

Figure 4A:
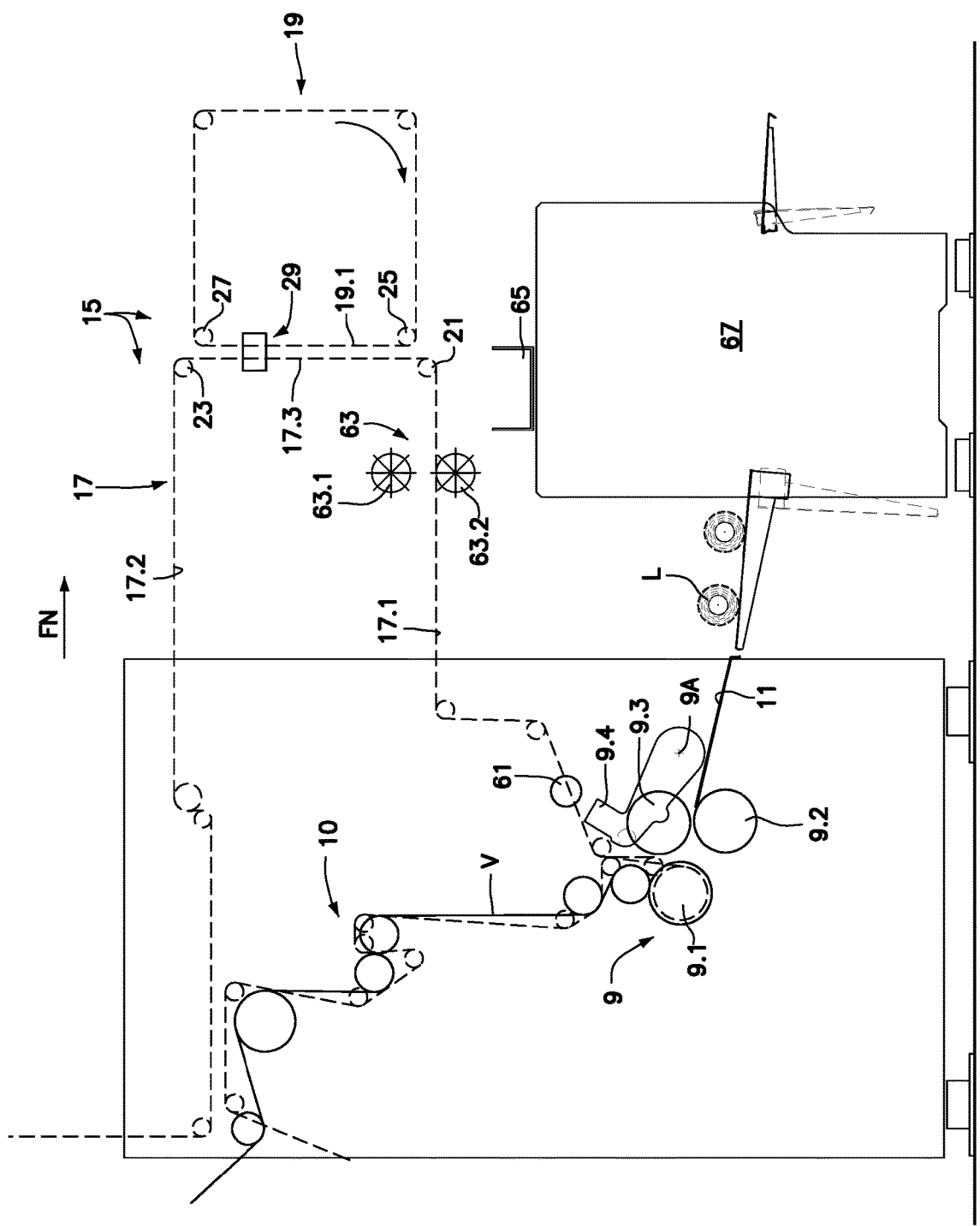
Figure 4B:
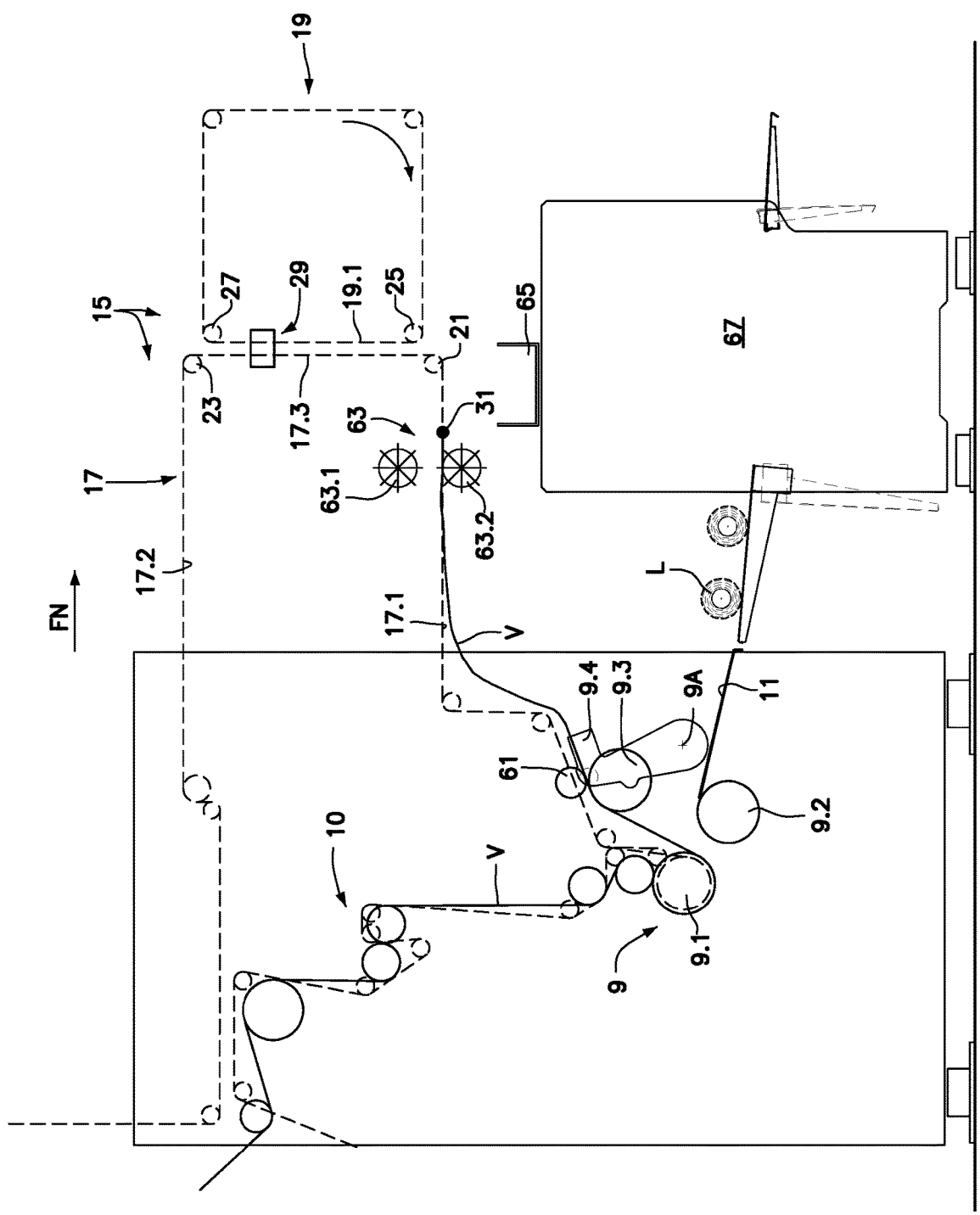
Figure 4C:
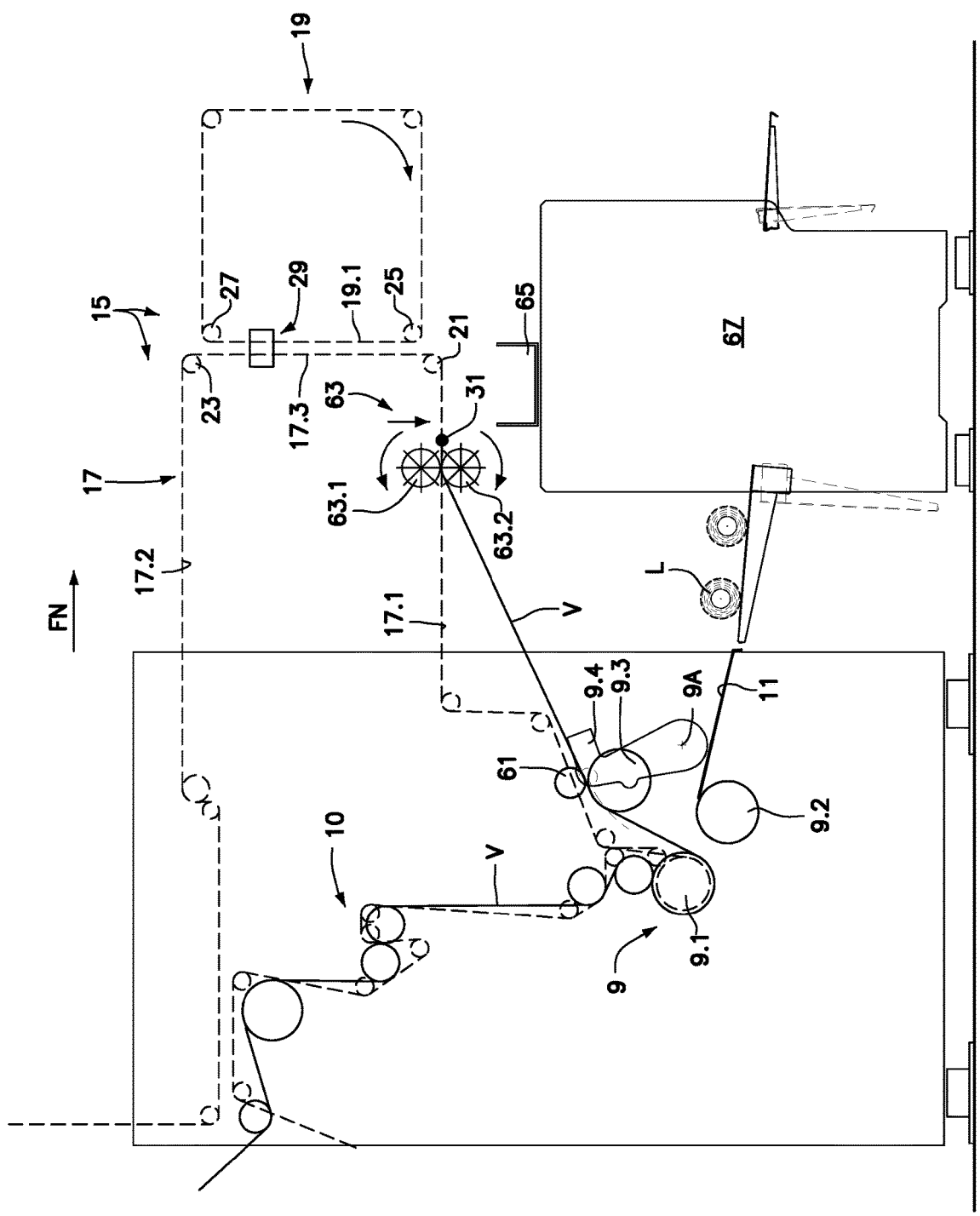
Figure 4D:
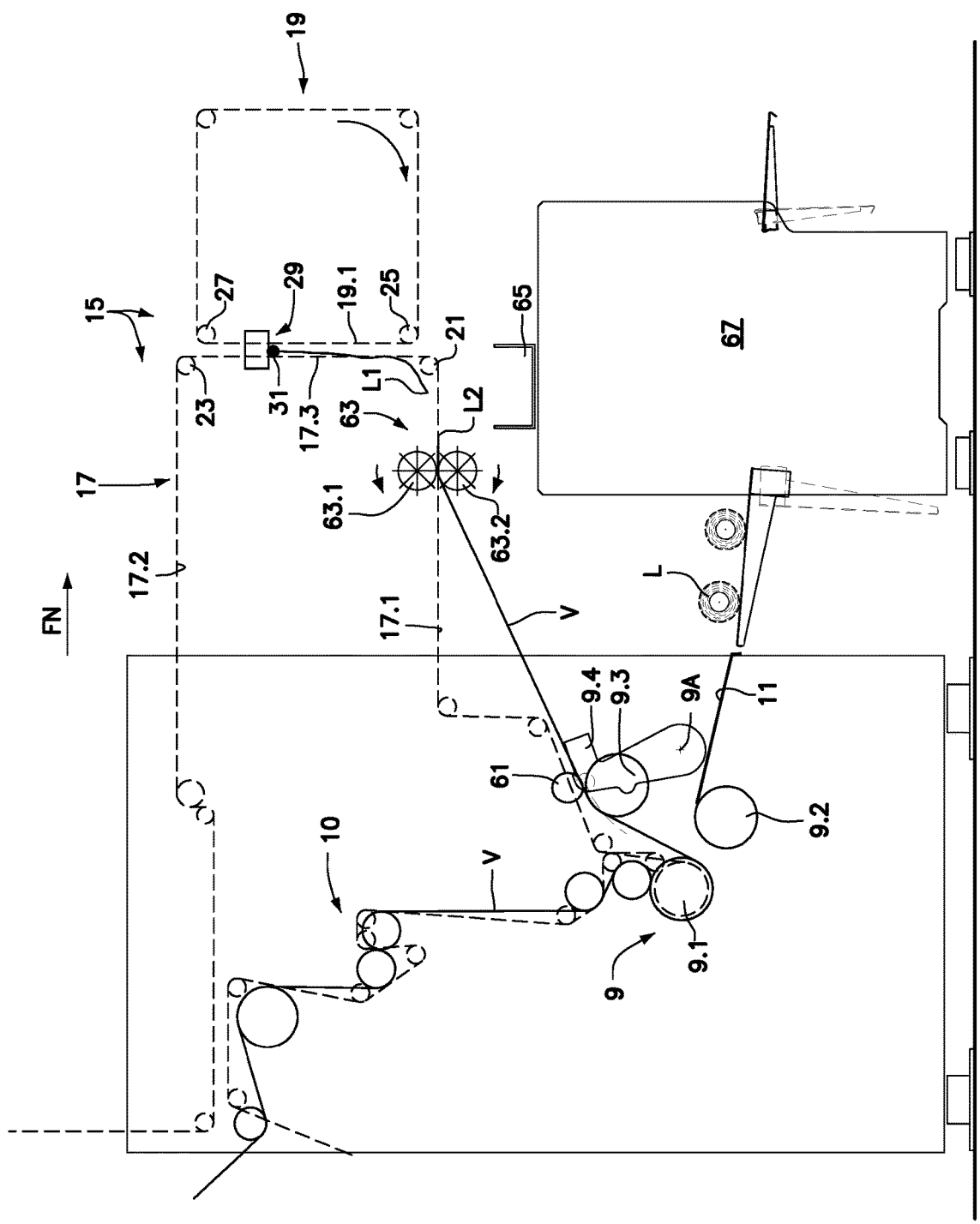
Figure 4F:
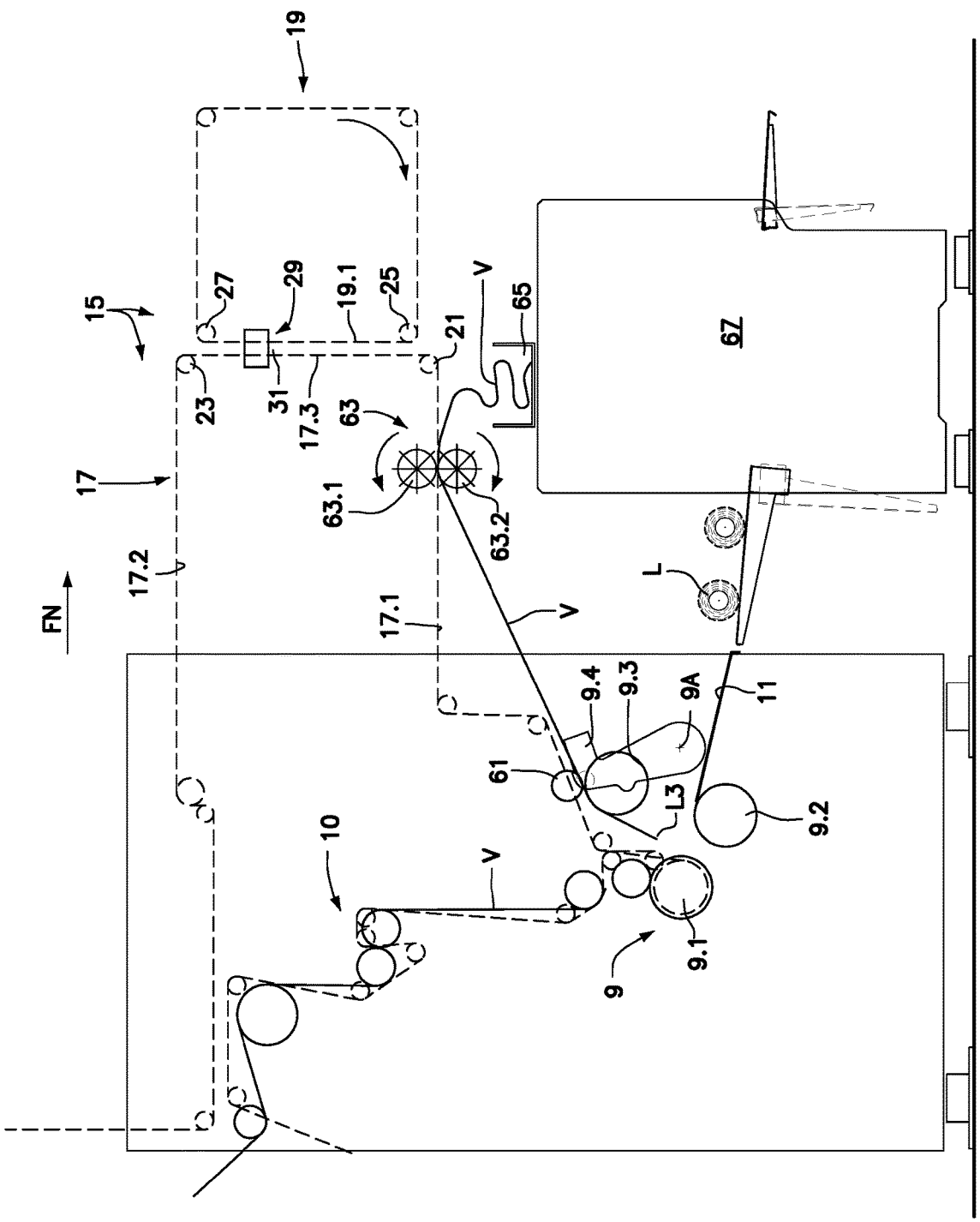
Figure 4G:
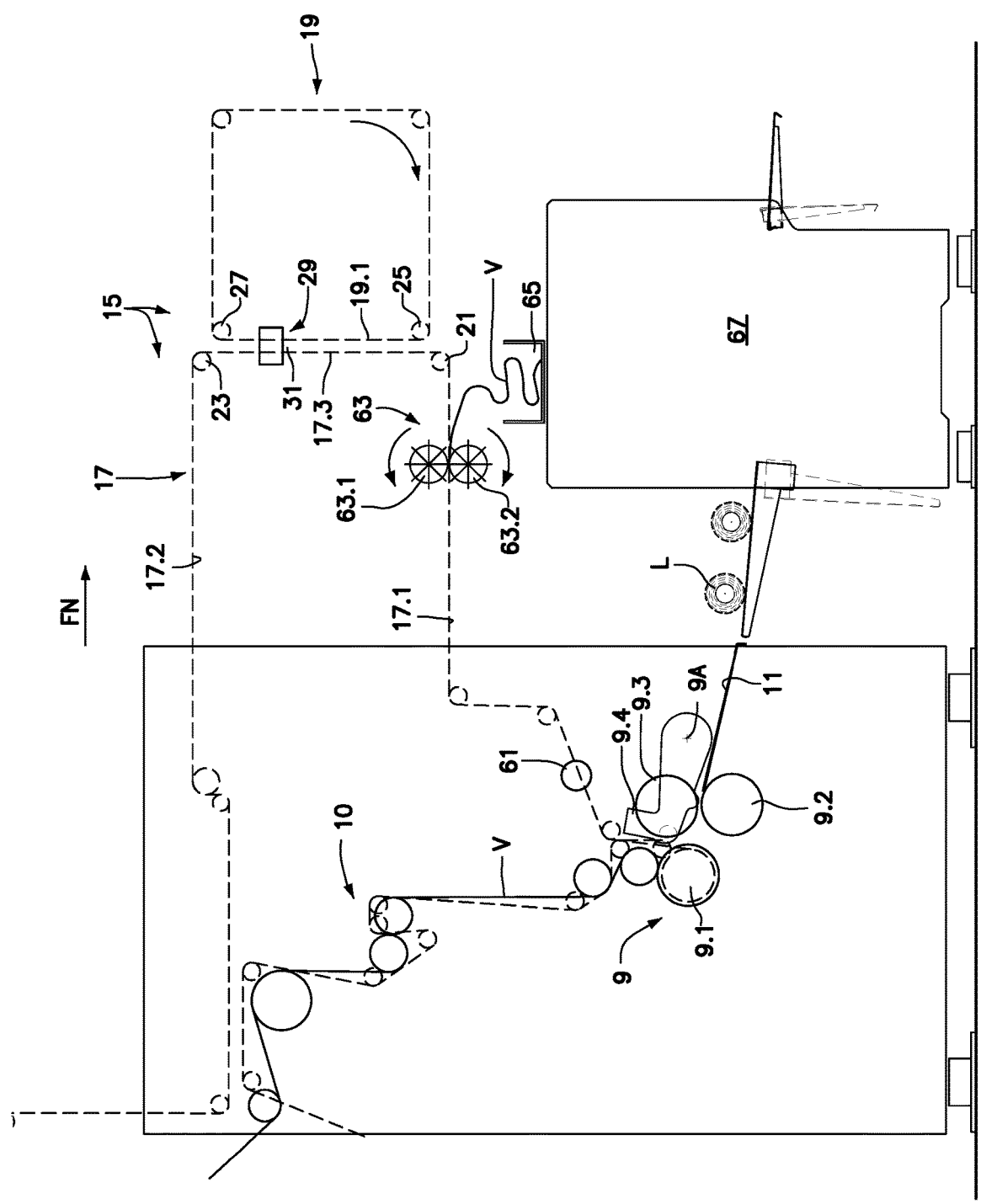
Figure 4H:
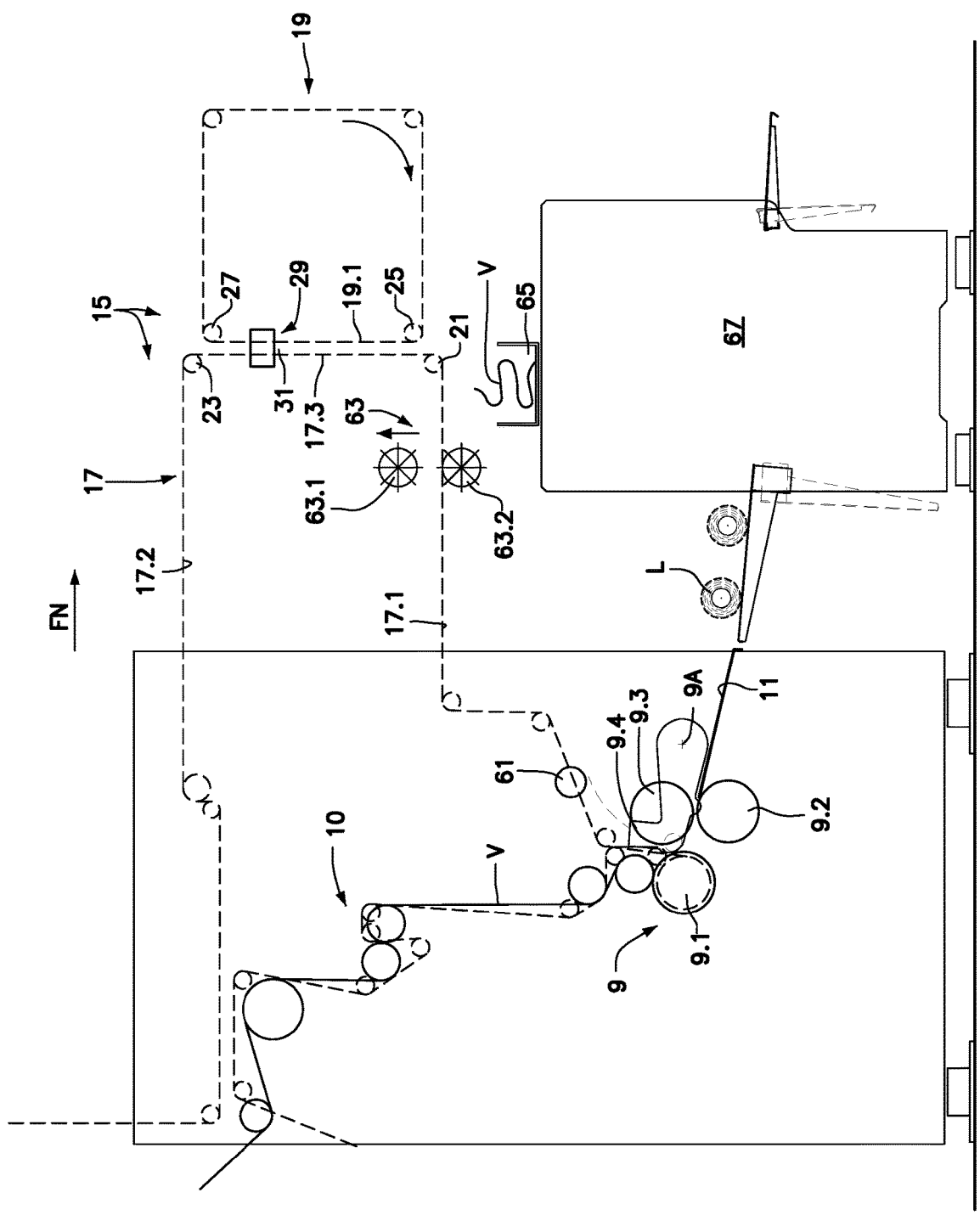

With reference to FIGS. 3 to 4H, herein described are the main members of the threading device for inserting the ply/plies, which form the web material, through the rewinder 7 up to the winding unit 9.

The threading device, generally indicated with 15, comprises a first flexible member 17, for example in the form of a belt. The first flexible member 17 is a continuous flexible member, which follows a closed path and forms a threading path 17.1 and a return path 17.2. The threading path extends from a point upstream of the embossing-laminating machine 5 up to a point downstream of the winding unit 9 with respect to the overall advancement direction of the web material N along the converting line 1, which direction is indicated with FN. More in particular, the threading path 17.1 extends from the inlet of the rewinder up to an area downstream of the winding unit 9 and in particular up to a position downstream of the rewinder 7 and external with respect thereto. The return path or branch 17.2 generally extends to a height higher than the threading path or branch 17.1.

As shown in FIGS. 1 to 3, in particular, the threading path 17.1 approximately follows the path P of the web material N when the latter is inserted into the converting line 1. The threading path 17.1 and the return path 17.2 of the first flexible member 17 are defined by a plurality of pulleys arranged on a side of the converting line, one or more of which are motor-driven.

Furthermore, the threading device 15 comprises a second flexible member 19, for example comprising a belt. For purposes clarified hereinafter, the two flexible members 17, 19 have substantially the same structure. In the illustrated embodiment, the second flexible member is also a continuous flexible member, i.e. it moves along a closed path; however this is not strictly necessary, as explained hereinafter. The closed path of the second continuous flexible member 19 is in particular visible in FIGS. 4A-4H.

Along each of the paths of the first flexible member 17 and of the second flexible member 19 two respective portions 17.3 and 19.1 thereof are provided, wherein the two flexible members 17 and 19 are arranged side by side with respect to each other. The two portions 17.3 and 19.1 are defined between two pairs of guide pulleys labelled 21, 23 and 25, 27 respectively. Defined between the pulleys 21, 25 and 23, 27 is a transfer position 29, in which an element 31 for anchoring the web material, which can be reversibly constrained to one and to the other of the flexible members 17, 19, is transferred from the first flexible member 17 to the second flexible member 19.

Figure 9A:
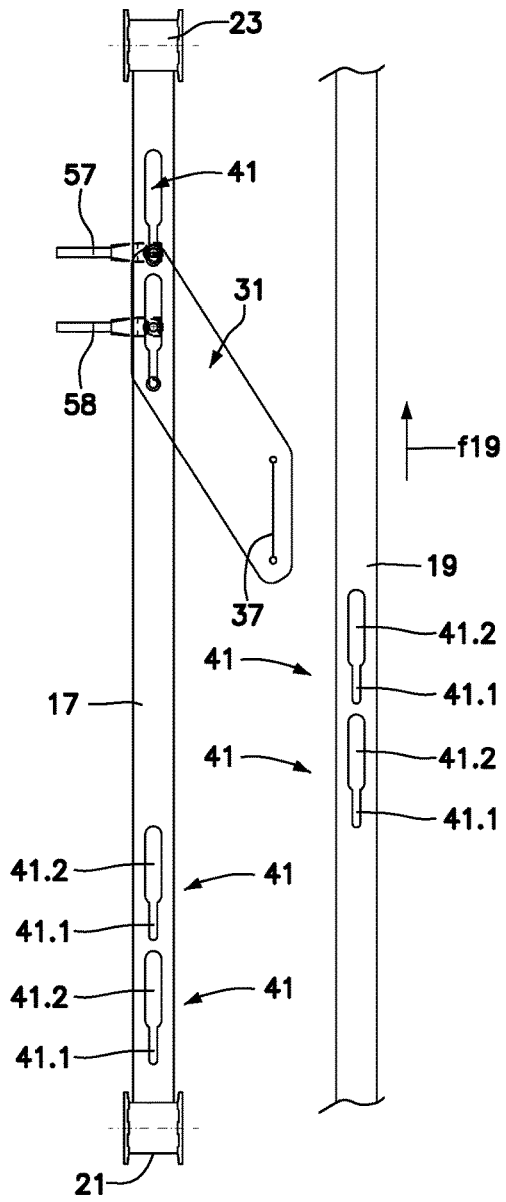
FIGS. 9A-9E is a schematic of the transfer sequence of an anchoring element from a first flexible member to a second flexible member through the transfer device.
Figure 9B:
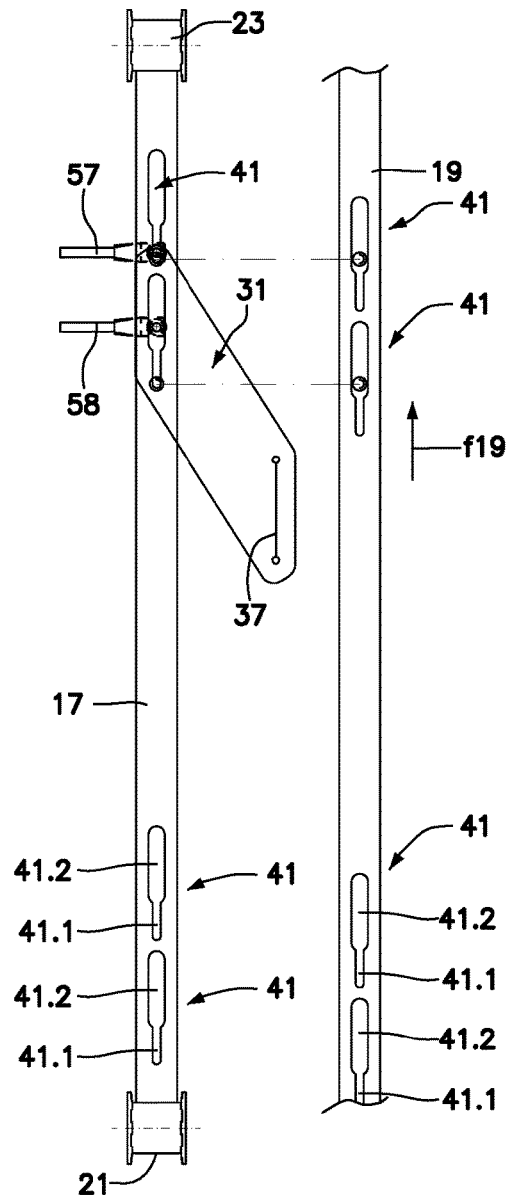
Figure 9C:
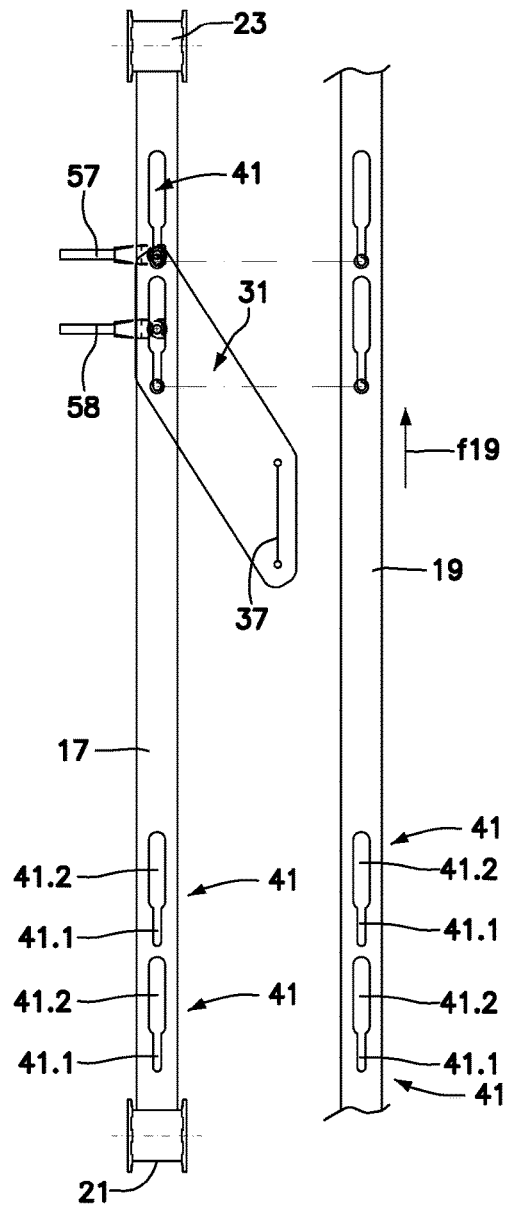
Figure 9D:
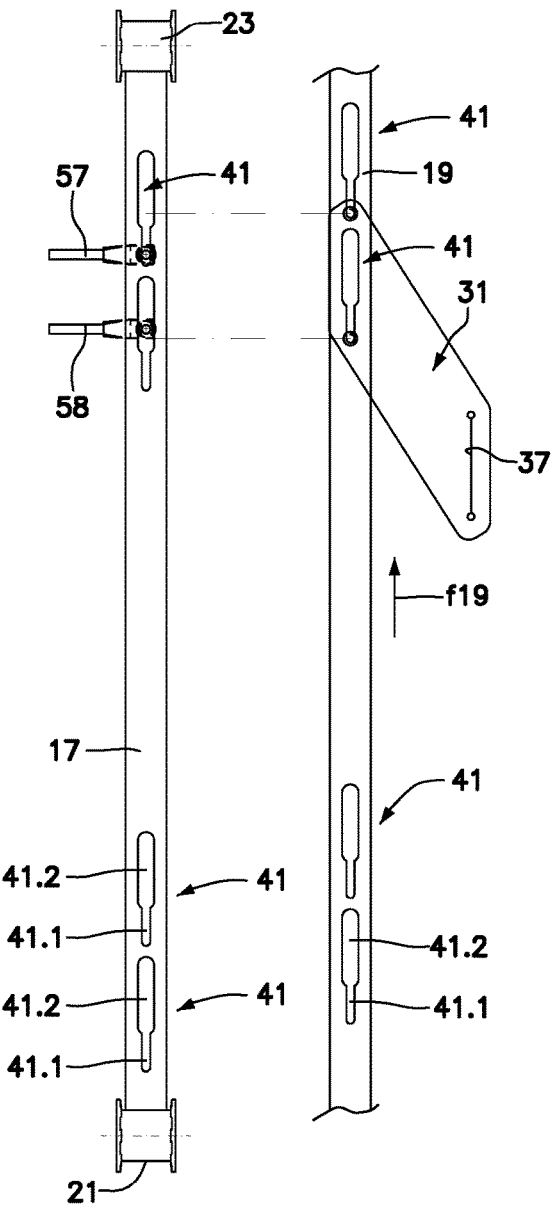
Figure 9E:
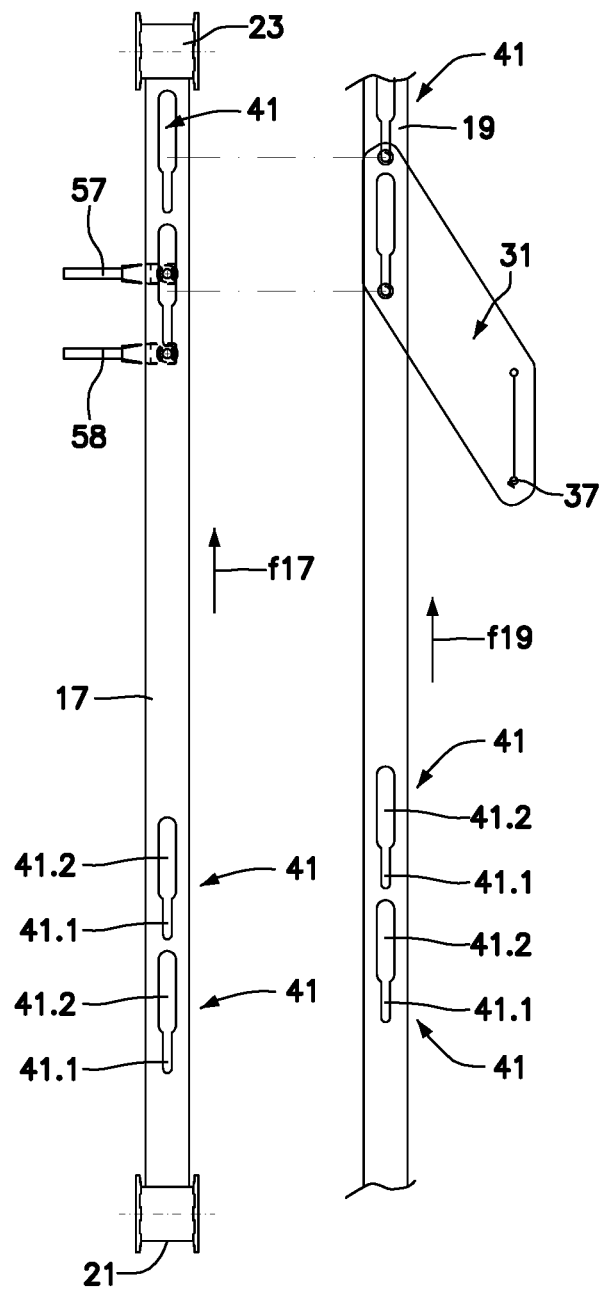
Figure 11:
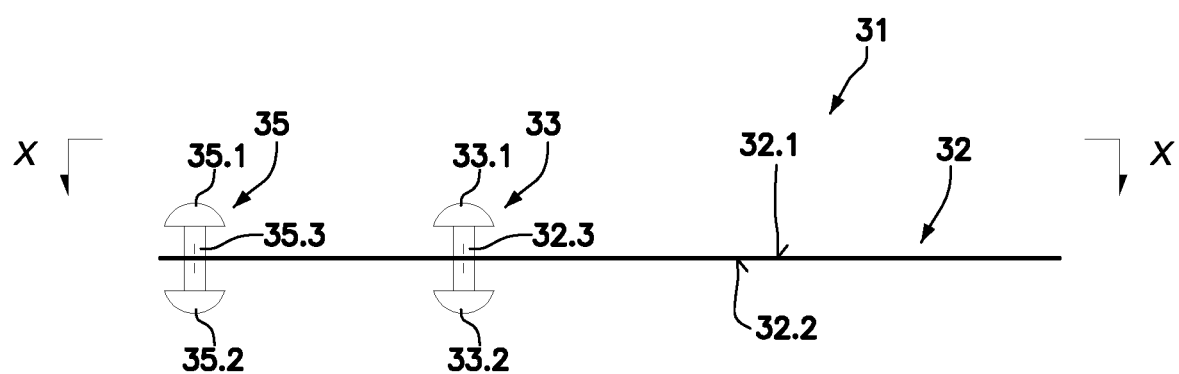
FIG. 11 is a lateral view according to line XI-XI of FIG. 10.
Figure 10:
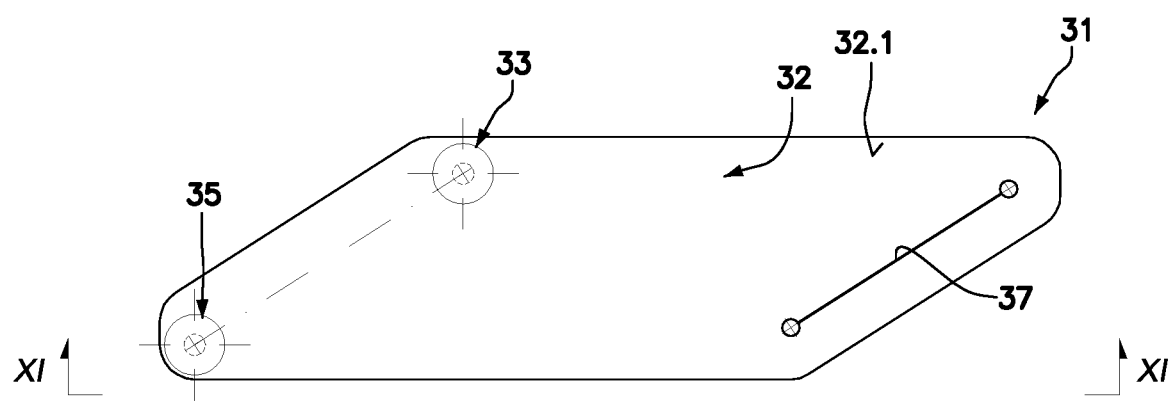
FIG. 10 is a plan view of an anchoring element according to line X-X of FIG. 11.

The anchoring element 31 is shown in detail in FIGS. 10 and 11, while FIGS. 5 to 9B show how the anchoring element cooperates with the flexible members 17, 19 to draw the ply of web material along a threading path and how the anchoring element is transferred from one to the other of the two flexible members 17, 19.

As shown in particular in FIGS. 9 and 10, the anchoring element 31 comprises a sheet 32, for example made of plastic material. In the illustrated embodiment, the sheet 32 is has a quadrangular shape, and preferably is parallelogram-shaped with two larger sides and two smaller sides. Constrained to the sheet 32 is a coupling member for coupling the anchoring element 31 to the first continuous flexible member 17 and to the second continuous flexible member 19.

In the illustrated embodiment, the coupling member comprises a pair of stems 33, 35, which pass through the sheet 32, so as to project from a first face 32.1 and from a second face 32.2 of the sheet 32. Each stem comprises two respective end expansions 33.1, 33.2 and 35.1, 35.2, projecting with respect to the two faces 32.1 and 32.2 of the sheet 32. Indicated with 33.3 and 35.3 are central portions of the stems 33, 35, between the respective end expansions.

In the illustrated embodiment, the two stems 33, 35 are arranged in proximity of one of the two short sides of the sheet 32 and more precisely in the vicinity of two vertices of the parallelogram. Along the opposite smaller side, the sheet 32 has a member for engaging the leading edge of a ply to be threaded. In the illustrated embodiment, such engagement member comprises a notch or slot 37, through which the leading edge of a ply V can be inserted.

Figure 5:
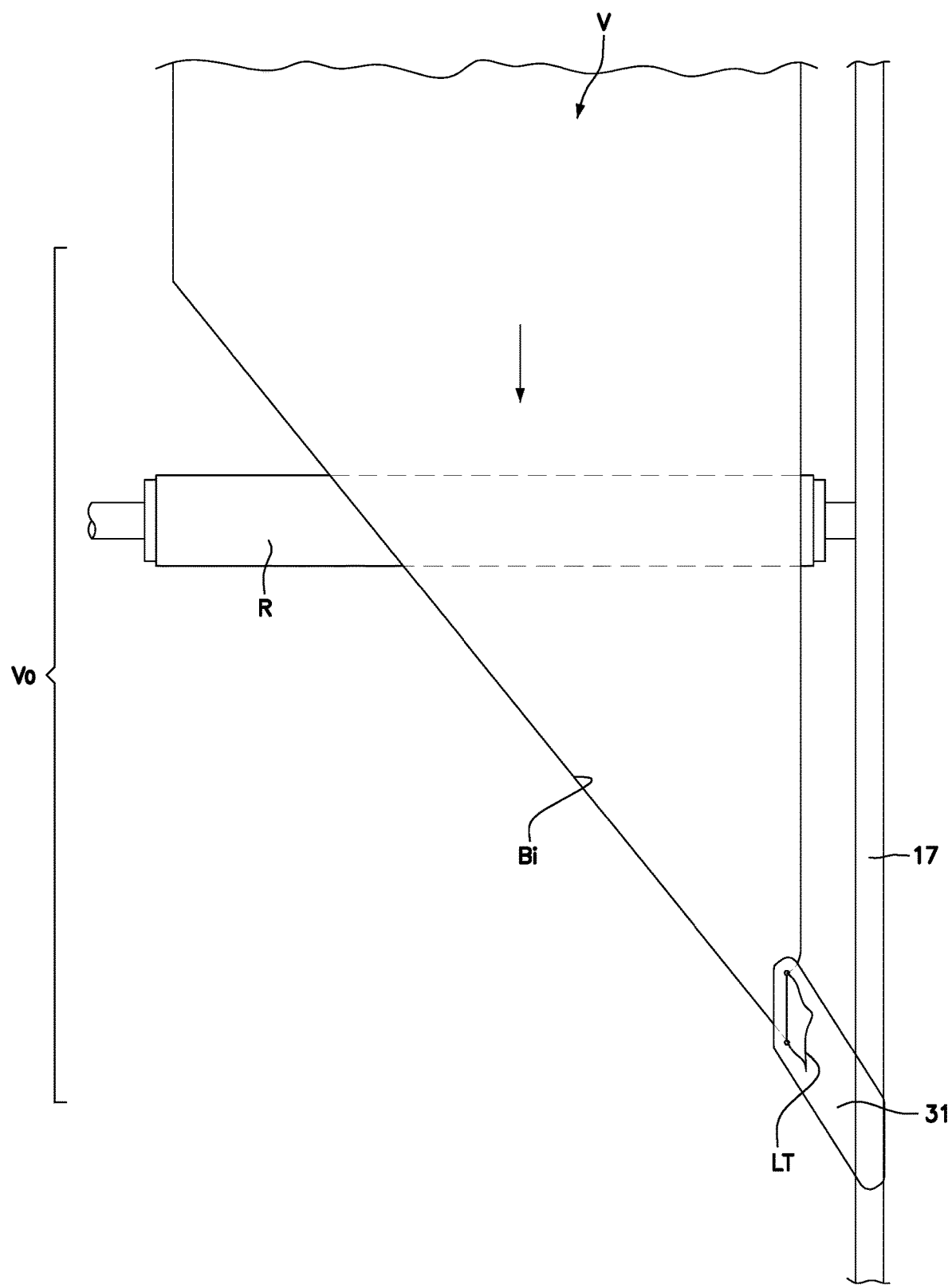
FIG. 5 is the leading edge of a ply during threading.

FIG. 5 schematically shows the relative position of the continuous flexible member 17 with respect to a generic roller R which defines the path P of the web material N along the portion of converting line 1, in which the first continuous flexible member 17 is arranged. As shown in FIG. 5, the continuous flexible member 17 is arranged on one side of the line, that is outside the useful portion of the rollers R, which guide the web material N, i.e. each ply V that it consists of.

The initial portion V0 of each ply V, ending with a leading edge LT, and which is to be threaded in the converting line 1, is generally triangular-shaped, with an inclined initial edge Bi. Through the threading operations, described in greater detail hereinafter, the leading edge LT and the initial portion V0 must be passed through along the entire path P of the web material N up to taking the initial portion V0 outside and beyond such path. The initial portion V0 is discarded before beginning the manufacturing of the rolls made of web material, as described below in detail.

In order to thread each ply V of the web material N, a respective anchoring element 31 is used, which is drawn along the threading path of the first flexible member 17 and transferred to the second flexible member 19, as illustrated in detail in FIGS. 6A, 6B, 7, 8, 9A-9E and described hereinafter.

Preliminarily, it should be noted that each of the two flexible members 17, 19 has a plurality of slots 41, extending along the longitudinal direction of the flexible members 17, 19. The slots 41 are arranged in pairs and each has a narrower portion 41.1 and a wider portion 41.2. The transversal dimension of the narrow slot portion 41.1 is such to allow the thinner central portions 33.3 and 35.3 of the stems 33, 35 to pass through but not allow the end expansions 33.1, 33.2 and 35.1, 35.2 to pass through. The transversal dimension of the wide slot portion 41.2 is such to allow also the end expansions 33.1, 33.21, 35.1, 35.2 of the stems 33, 35 to pass through.

A transfer device 51 is arranged in the transfer position 29, defined between the pulleys 25, 27. In some embodiments, the transfer device 51 may have a shaped plate 53 on which the first flexible member 17 may slide, or which can be selectively contact the flexible member and move away therefrom through a movement according to arrow f51. A bracket for fixing the transfer device 51 to a side (not shown) of the converting line 1 is indicated with 55.

Figure 6A:
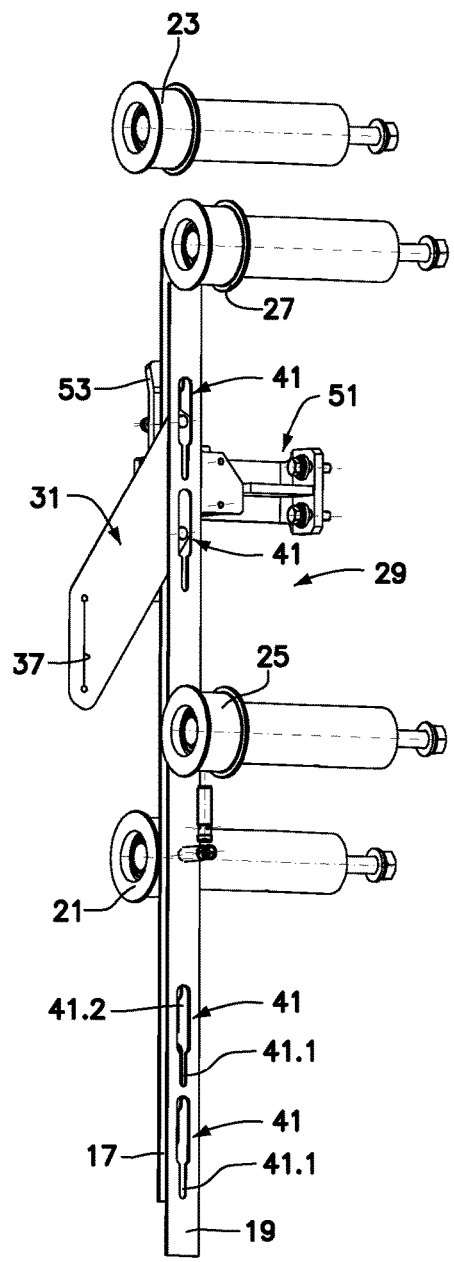
FIGS. 6A and 6B are axonometric views of the transfer device in an embodiment and according to two different angles.
Figure 6B:
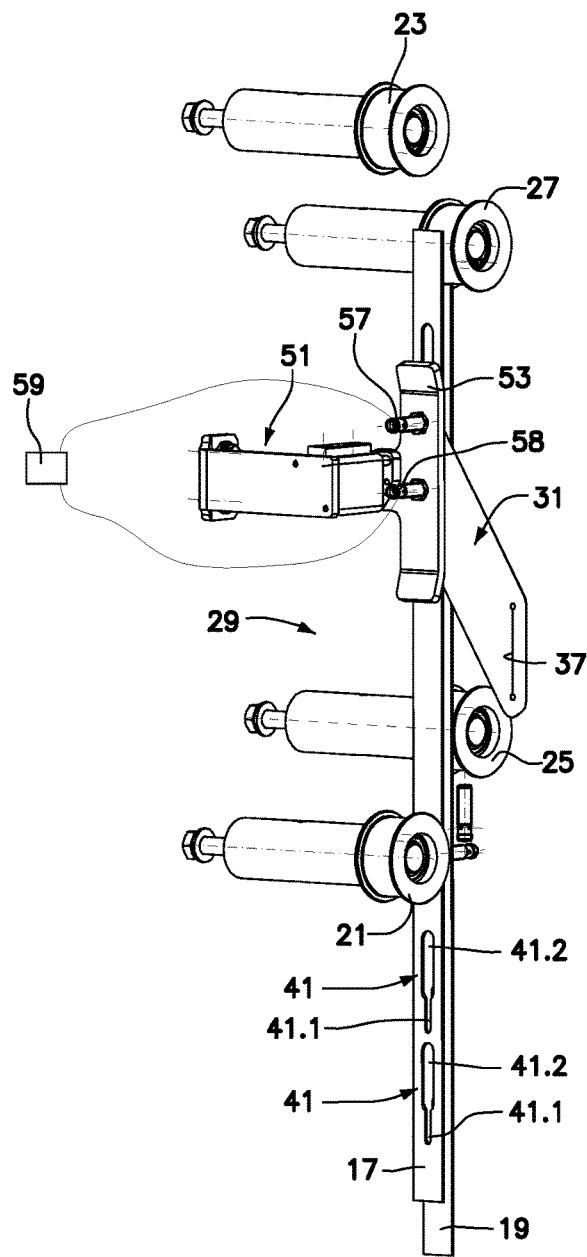
Figure 8:
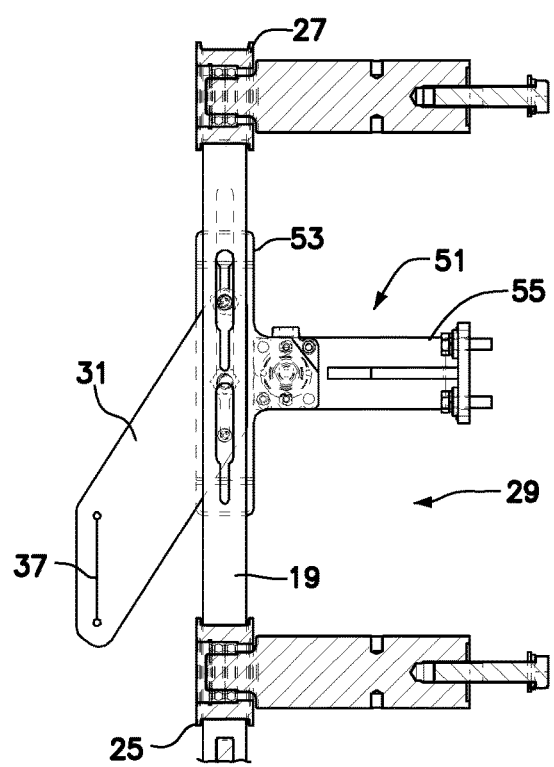
FIG. 8 is a section according to line VIII-VIII of FIG. 7.
Figure 7:
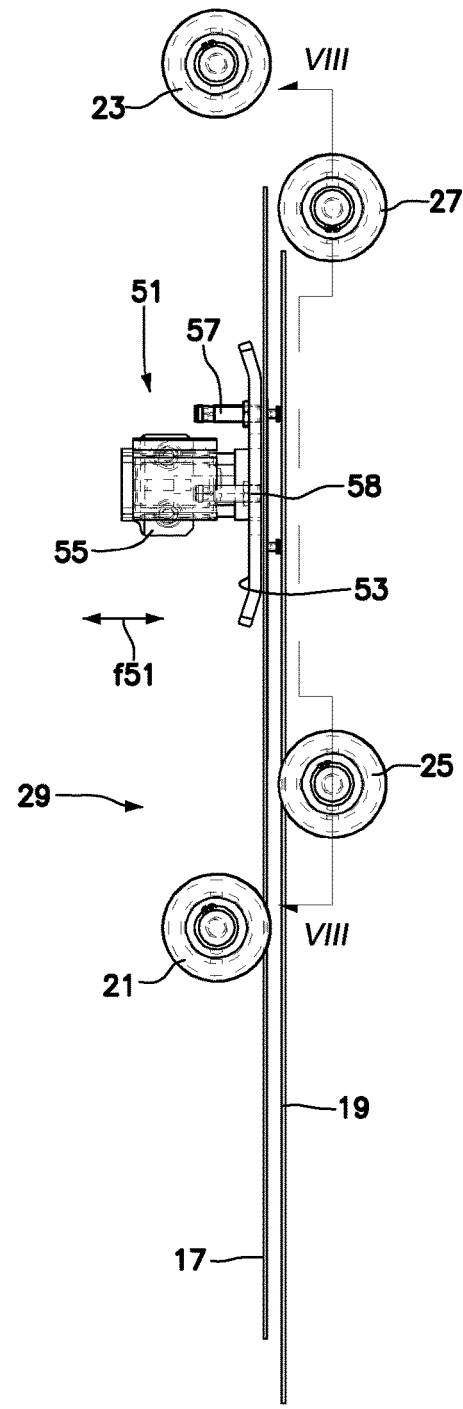
FIG. 7 is a lateral view of the transfer device of FIGS. 6A, 6B.

Sensors 57, 58, in particular shown in FIGS. 6B and 7 and in the sequence of FIGS. 9A-9E, are associated with the transfer device 51. The sensors 57, 58 may be capacitive sensors, magnetic sensors, optical sensors or sensors of any other kind, adapted to detect the presence of the end expansions of the stems 33, 35 and they are used to manage the steps for transferring the anchoring element 31 from the flexible member 17 to the flexible member 19. The sensors 57, 58 may be interfaced with a control unit schematically indicated with 59 (shown in FIG. 6B and omitted for the sake of simplicity in the remaining figures), which also manages the movement of the continuous flexible members 17, 19.

The sequence for transferring the anchoring element 31 from the continuous flexible member 17 to the continuous flexible member 19 is illustrated in detail in the sequence of FIGS. 9A-9E. In these figures, the flexible members 17, 19 are illustrated spaced from each other for greater clarity of representation.

In FIG. 9A, the anchoring element 31, which moves with the first flexible member 17 according to arrow f17, reaches the position of the sensor 57, which detects the arrival of the stem 35 of the anchoring element 31 and controls the stop of the flexible member 17, while the second flexible member 19 continues to advance according to arrow f19 in the direction matching the advancement of the first flexible member 17. In the position of FIG. 9A, the transfer device 51 pushes the stems 33, 35 towards the second flexible member 19, so that when the latter passes with two slots 41 along the position in which the stems 33, 35 are located, the end expansions of the latter facing towards the second continuous flexible member 19 enter into the wider portions 41.2 of the two slots 41 (FIG. 9B). Continuing the advancement of the second flexible member 19, the stems 33, 35 enter into the narrower slot portions 41.1 (FIG. 9C), so that the anchoring element 31 cannot be dislodged from the second continuous flexible member 19. Continuing the advancement of the second flexible member 19 at a speed higher than the first flexible member 17 (which may possibly continue to remain stationary) the stems 33, 35 of the anchoring element 31 slip off from the narrower portions 41.1 of the slots 41 of the first continuous flexible member 17 (FIG. 9D). At this point, the two flexible members 17, 19 start to advance at the same speed (FIG. 9E) and, due to the diverging of the paths of the flexible members 17, 19 downstream of the pulleys 23, 27, the anchoring element 31 remains attached to the second flexible member 19 and follows the path thereof, moving away from the first flexible member 17.

When the leading edge of a ply is engaged to the anchoring member, the operations described above allow to transfer the leading edge from one flexible member to the other. As will be clear from the following description, this allows to implement various embodiments of the method for threading the web material in the winding unit 9 of the rewinder 7. The same transfer criterion may be applied to carry out the threading of a plurality of plies through the embossing-laminating machine 5, as described hereinafter.

Using the structure and method described above in other machines forming the production or converting line, such as for example unwinders, printing machines, rolling machines, embossing-laminating machine, and generally each machine or apparatus that requires the transfer of the leading edge from one flexible member to another cannot be ruled out. A specific application to an embossing-laminating machine will be described hereinafter.

A first embodiment of the threading of the web material N, and more precisely of the plies V that it consists of, through the rewinding 7 up to the winding unit 9 is described hereinafter with specific reference to the sequence of FIGS. 4A a 4H. In this embodiment, besides the members described herein, arranged along the threading path of the first flexible member is an abutment member 61, for example an abutment roller, adapted to co-act with one of the winding rollers of the winding unit 9. In the illustrated embodiment, the abutment roller 61 is adapted to co-act with the winding roller 9.3, which is supported by a pair of moveable arms 9.4, pivoting around an axis 9A, to bring the winding roller 9.3 alternately in a winding position and in an auxiliary position, in which it co-acts with the abutment roller 61.

Furthermore, arranged along the threading path of the first flexible member 17, between the abutment roller 61 and the transfer position 29, is a device 63 for severing the web material, i.e. the individual plies V that it consists of. In the illustrated embodiment, the severing device 63 comprises a pair of counter-rotating rollers 63.1, 63.2, at least one of which is motor-driven; preferably both rollers 63.1, 63.2 are motor-driven at a suitably controlled speed.

The counter-rotating rollers 63.1, 63.2 may be adapted to generate transversal pre-breaking lines on the plies V of the web material N, which are threaded along the threading path. For example, the counter-rotating rollers 63.1, 63.2 may be provided with perforation blades and anvil-blades.

A generic ply V, which may be the ply V1 or the ply V2 of the web material N, or the sole ply of a single-ply web material, is threaded as follows. The initial edge of the ply V is anchored to an anchoring element 31 as illustrated in FIG. 5 in a suitable position of the converting line 1, accessible by the operator. For example, the leading edge LT of the ply V may be anchored to the respective anchoring element 31 upstream of the embossing-laminating machine 5, so as to thread the ply also through the embossing-laminating machine, before reaching the rewinder 7.

The first flexible member 17 is advanced along the threading path up to the winding unit 9 and beyond the latter, as shown by the dashed line in FIG. 4A. The threading path up to the winding unit 9 is approximately coincident with the path P of the web material N during the normal operation of the converting line 1.

In the subsequent step (FIG. 4B), the anchoring element 31 advances further along the threading path beyond the pair of rollers 63.1, 63.2 which form the severing device 63. In this step, the two rollers 63.1, 63.2 are spaced from each other, to pass the leading edge LT of the ply V beyond the nip between them. In FIG. 4B, the anchoring element 31 is schematically shown downstream of the nip between the rollers 63.1, 63.2 of the web material severing device 63.

In this step, it may also be provided for that the winding roller 9.3 is brought to a position for co-acting with the abutment roller 61, by pivoting the arms 9.4 that support it. Thus, the winding roller 9.3 and the abutment roller 61 form a pinching nip. If the winding roller 9.3 (which is motor-driven) is driven in rotation at a peripheral speed equal to the speed of the first flexible member 17, the ply V is supplied without jerking through the pinching nip formed between the abutment roller 61 and the winding roller 9.3.

Subsequently (FIG. 4C) the rollers 63.1, 63.2 of the severing device 63 close, thus pinching the ply V between them and start to rotate in opposite directions, as shown by the arrows in FIG. 4C, to advance the ply V between them. The anchoring element 31 advances with the first flexible member 17 towards the transfer position 29.

The step of severing the ply V by means of severing device 63 is shown in FIG. 4D. To this end, the rollers 63.1, 63.2 stop or slow down to stretch the ply V of the web material between the pinching nip comprised between the rollers 63.1, 63.2 and the anchoring element 31, which reaches the transfer position 29 in this step. The two edges obtained by severing the ply V are shown in FIG. 4D with L1 and L2. Severing is facilitated by the formation of pre-breaking lines by means of rollers 63.1, 63.2, for example perforation lines. However, the possibility of using other ply severing methods, for example by means of a blade arranged between the plies 63.1, 63.2 and the transfer position 29, which can act on a web portion stretched between the anchoring element 31 and the pair of rollers 63.1, 63.2, cannot be ruled out. In this case, the latter may be without pre-breaking members.

The subsequent step, in which the anchoring element 31 has been transferred from the first flexible member 17 to the second flexible member 19, with a sequence of the type illustrated in FIGS. 9A-9E described above, is shown in FIG. 4E. In the position of FIG. 4E, the anchoring element 31 may stop, while the severed ply V is supplied by means of rollers 63.1, 63.2 which rotate in opposite directions. The winding roller 9.3 maintains contact with the abutment roller 61. The ply V is thus kept under tension and guided. The ply which advances beyond the pair of rollers 63.1, 63.2 is collected in a collection system 65, as shown in FIG. 4E. The ply V continues to advance until the entire triangular-shaped initial portion of the ply V, i.e. the portion where the inclined edged Bi is located, passes through the winding unit 9 (FIG. 5).

The collection system 65, as well as the transfer position 29, are advantageously outside the rewinder 7, for example above a gluing device 67, which is arranged downstream of the rewinder 7 to receive rolls or logs L of web material N wound (shown with dashed line, since they are not present in the line in this threading step), the gluing device being used to seal the outer web edge of the rolls or logs L.

To start winding the first roll or log, the ply V in the winding unit 9 must be severed. A severing system, not shown, with which the rewinder 7 is provided, may be used to this end. The web material often needs to be stretched for the severing system to work. The winding roller 9.3 can co-act with the abutment roller 61 to this end. Severing of the web material at the desired point, forming the leading edge of the web material which starts to wind into a first roll or log, is obtained by suitably controlling the peripheral speed of the winding roller 9.3 synchronised with the severing system (not shown) of the rewinder 7. The rewinder 7 may be adapted to manufacture rolls with or without a winding core, in manner a per se known.

A trailing edge L3 obtained upstream of the winding roller 9.3 is shown in FIG. 4F. The ply comprised between the edge L3 and the collection system 65 is fully unloaded through the rollers 63.1, 63.2 into the collection system so as to be removed by an operator, while the rewinder 7 is ready to start manufacturing rolls. FIG. 4G shows the subsequent step in which the edge L3 has reached the rollers 63.1, 63.2 and the winding roller 9.3 is returned to the winding position, where it co-acts with the rollers 9.1 and 9.2 to manufacture the rolls or logs L. In FIG. 4H, the unloading of the ply V into the collection system 65 has ended and the rollers 63.1, 63.2 have been moved away from each other once again. The winding rollers 9.1, 9.2, 9.3 are in the winding position. The converting line 1 may operate manufacturing rolls or logs L which are conveyed to the gluing device 67, while an operator may safely remove the waste web material accumulated in the collection system 65. The operator may also release the anchoring element 31 from the second flexible member 19 and return it to the inlet of the converting line or to the inlet of the embossing-laminating machine 5 so as to be used when a new threading is to be carried out.

The possibility of transferring the anchoring element 31 from the second flexible member 19 to the first flexible member 17 and then transfer it-through the first flexible member 17—upstream of the embossing-laminating machine 5, cannot be ruled out. Reverse operations with respect to the ones illustrated in the sequence of FIGS. 9A-9E, may be carried out to this end.

If the web material N comprises several plies, each of them may be threaded following a procedure like the one described above. In this case, both plies may be threaded towards the rewinder 7 each simultaneously along the respective path. In many cases, the path is different in an area upstream of the embossing-laminating machine 5, while it coincides downstream of the embossing-laminating machine 5. The plies V1 and V2 are often threaded in a staggered fashion, i.e. so as not to reach the rewinder 7 simultaneously but rather spaced along the first flexible member 17. In this case, two separate anchoring elements 31 are constrained to the first flexible member 17 at two points spaced from each other and the leading edge of a respective one of the plies to be threaded is fixed to each of such anchoring elements 31.

Therefore, when threading two plies, there is a step where the plies are threaded by the first flexible member 17 simultaneously but spatially staggered. In the subsequent step, before severing the first ply (FIG. 4D), the second ply is threaded by the flexible member 17 while the leading edge of the first ply is engaged to the second flexible member 19 which remains substantially stationary.

For example, it may be provided for that from the condition of FIG. 4C, the first threaded ply remains intact and is fed by the rollers 63.1, 63.2 towards the collection system 65, while the anchoring element 31, to which the leading edge is anchored, is transferred to the second flexible member 19. Once the leading edge of the first ply has been transferred, with the anchoring element 31, to the second flexible member 19, the latter may remain stationary, while the second flexible member 17 continues to advance a second anchoring element 31 to which the leading edge of the second ply is anchored until the threading thereof is complete. Both plies are simultaneously supplied in this step with the difference lying in the fact that the first ply, already threaded with the anchoring element 31 stationary, is accumulated in the collection system 65, while the second ply advances until threading is complete.

The second anchoring element 31 with the leading edge of the second ply is managed like the anchoring element to which the leading edge of the first ply is anchored and the two plies are severed together, before starting the winding operation, discarding the portions of the two plies downstream of the point where they were severed upstream of the winding roller 9.3 into the collection system 65 by means of the rollers 63.1, 63.2.

In another embodiment of the method illustrated in FIGS. 4A-4H, it may be provided for to keep the winding roller 9.3 at a distance from the abutment roller 61, thus without forming the pinching nip. The plies V1 and V2 are therefore made to pass above the roller 9.3 which is driven in rotation at a speed such to have a peripheral speed equal to the advancement speed of the plies. The roller 9.3 may be approached to the abutment roller 61 forming a pinching nip once all plies have been threaded and therefore the plies can be severed in the winding unit 9 as shown in FIG. 4F.

In a further embodiment, the rollers 63.1, 63.2 can be kept approached for the entire duration of the threading with the plies pinched therebetween.

The threading operations can be further facilitated by associating the anchoring element 31 with one or more load cells. For example, the latter may be integrated in the stems 33, 35 or applied in other positions of the anchoring element. In some embodiments, the load cells may have a laminar shape and may be applied to the sheet 32. Generally, the load cell/s associated with an anchoring element 31 may be configured and arranged to detect the tensile stress applied by the ply fixed to the anchoring element 31 during the threading steps. The load cell/s could be electrically powered by a battery system mounted on the respective anchoring element and transmit information through a wireless system. This allows to detect whether there are sudden tensile changes applied to the anchoring element 31. A sudden and significant change on the tensile stress, which could move from a normal operating value to a substantially null value, may be a sign that the ply is broken or that it has detached from the anchoring element during the threading operations. If this occurs, the operator may be notified right away, instead of having to wait to notice the problem when the anchoring element 31 reaches the end of the threading path and becomes visible outside the machine.

A different embodiment of the threading method is illustrated in the sequence of FIGS. 12A-12J. The same reference numbers indicate parts identical or equivalent to the ones described previously. Purely by way of example, the path of the first flexible member 17 is slightly different with respect to that of FIGS. 4A-4H, but it substantially operates in the same way. Furthermore, in this case the rollers 63.1, 63.2 have the sole purpose of advancing the plies forming the web material towards the collection system 65, but they may not have the purpose of severing the plies, which is not required in this embodiment.

Figure 12A:
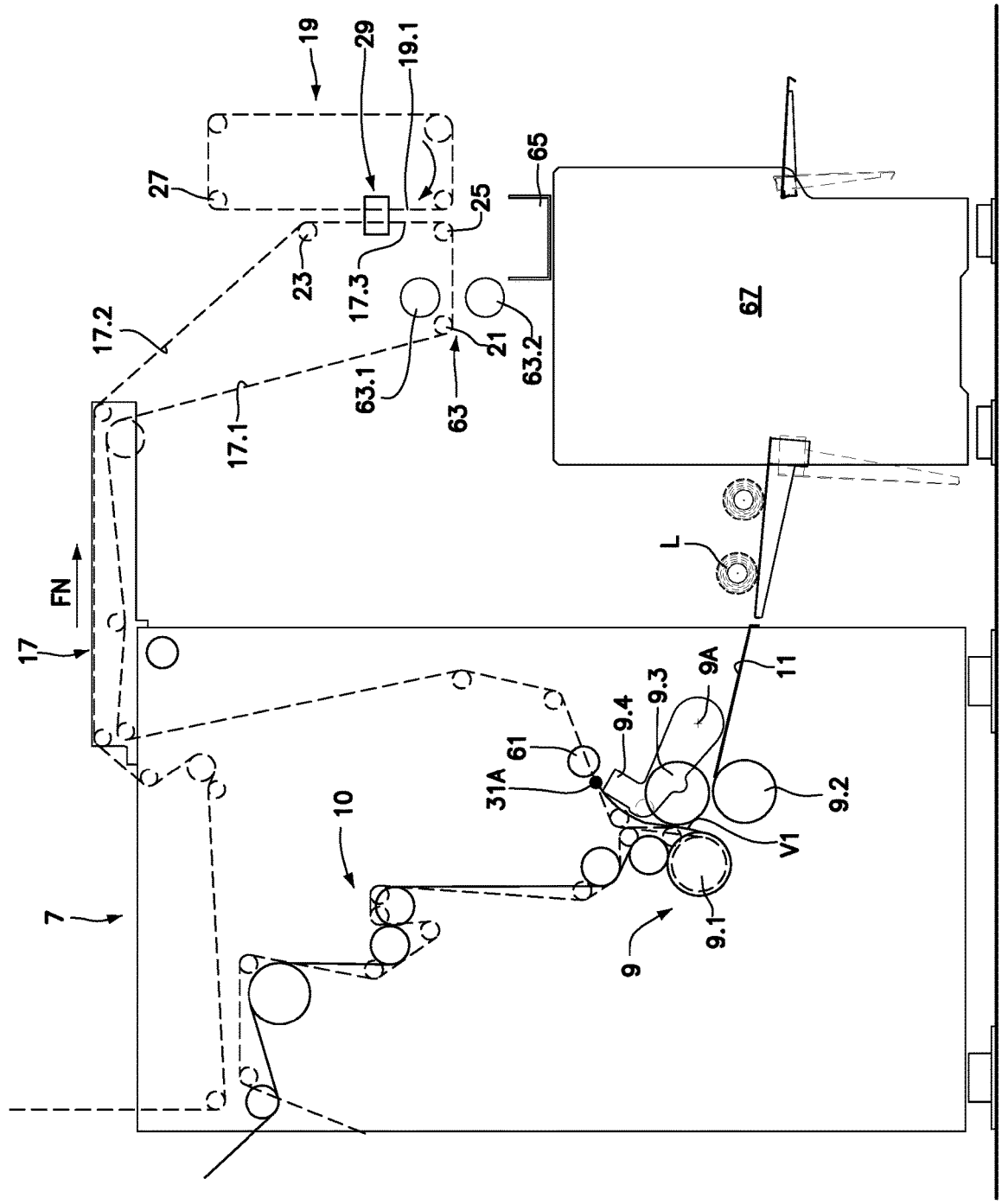
FIGS. 12A-12J are steps of a threading sequence in a further embodiment.

In FIG. 12A a first ply V1 is threaded by means of a first anchoring element 31A attached to the first flexible member 17. In FIG. 12A the first anchoring element 31A has moved beyond the winding unit 9 and moves towards the transfer position 29. The two rollers 63.1, 63.2 are spaced from one another to allow the ply V1 to pass through. In another embodiment, not shown, the two rollers 63.1, 63.2 may be approached forming a nip for drawing the ply V1. In this case, both rollers 63.1, 63.2 must rotate in opposite directions at a peripheral speed equal to the speed of the ply V1. The second flexible member 19 may be temporarily stationary.

Figure 12B:
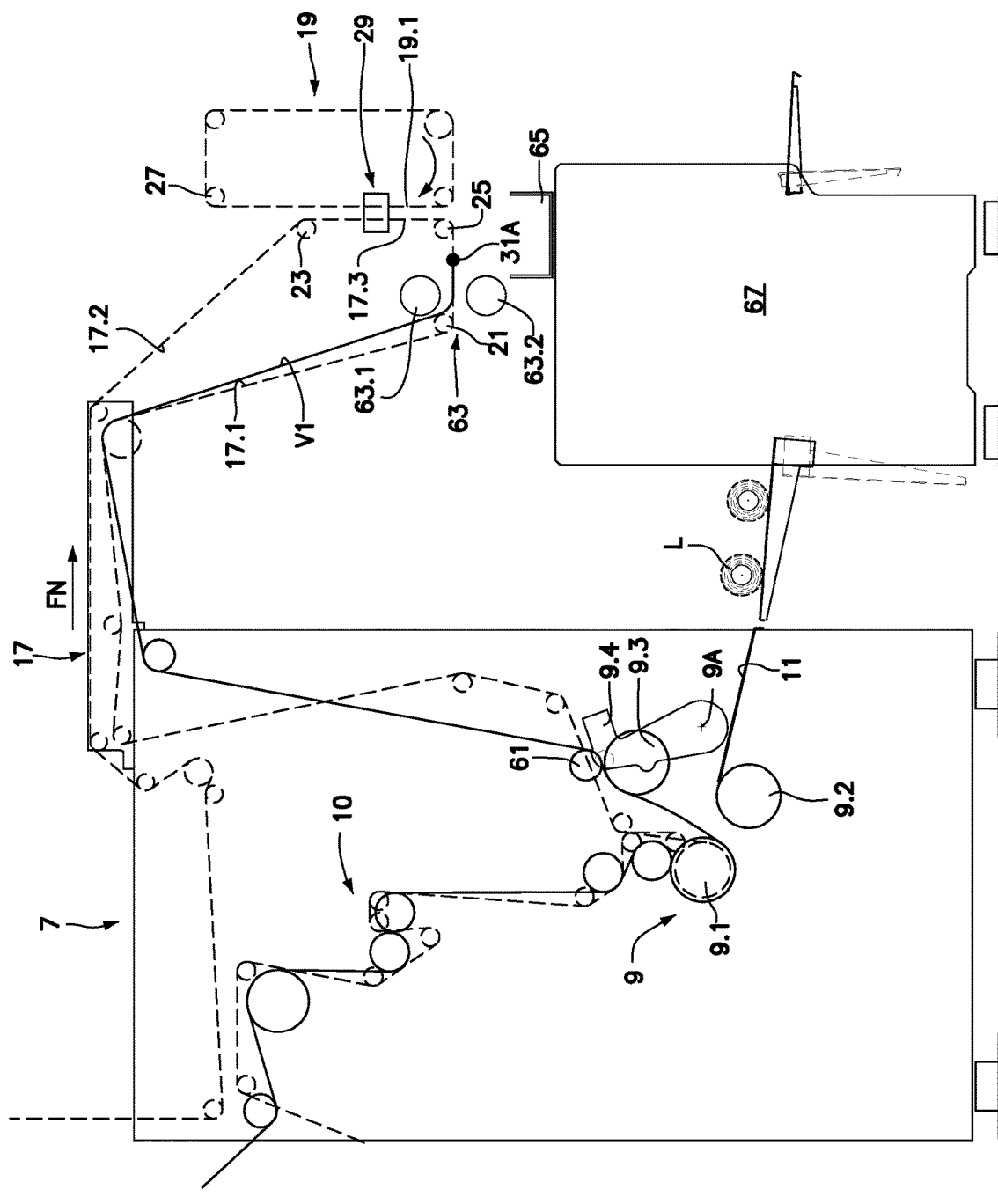
Figure 12C:
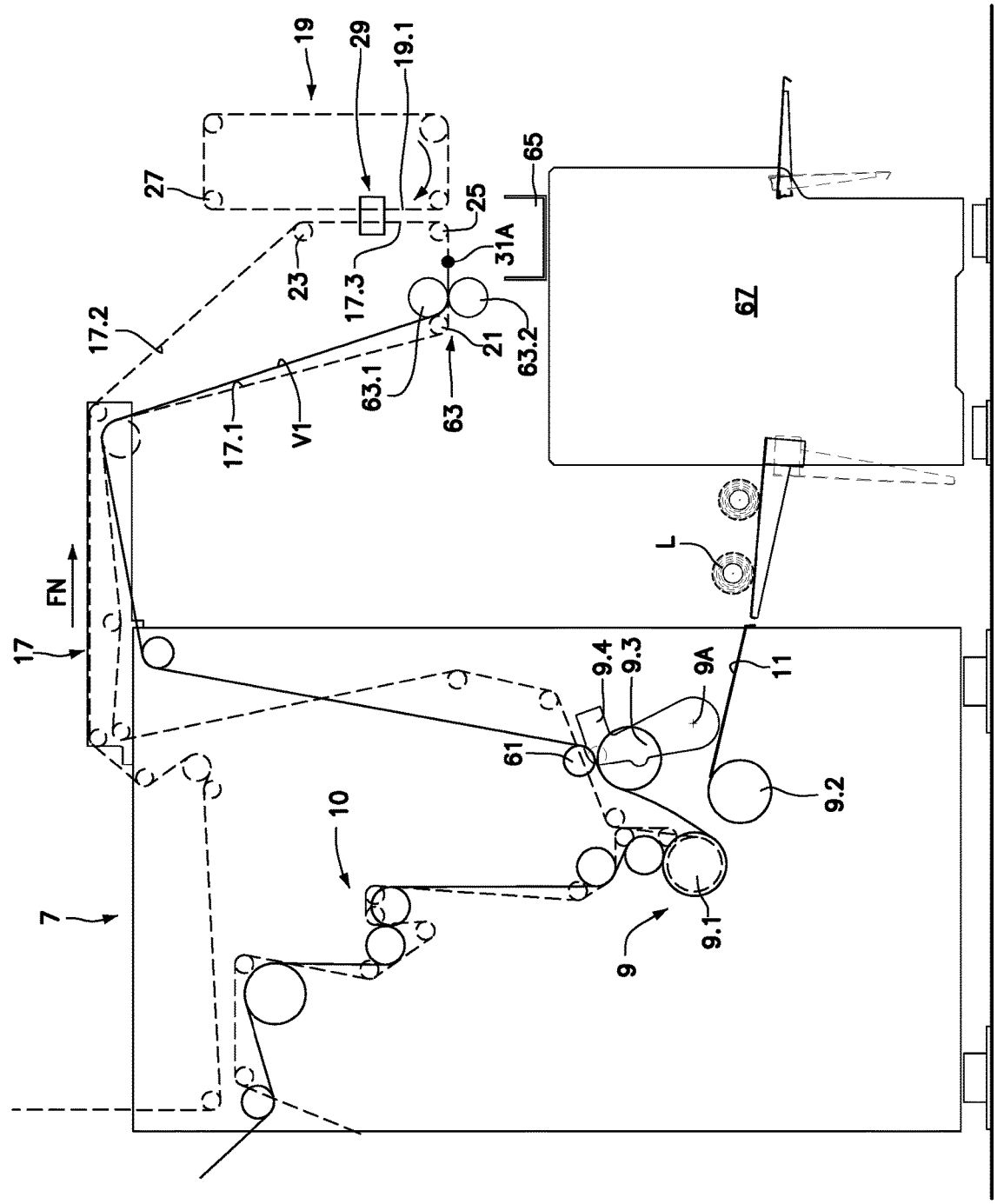

In FIG. 12B the first anchoring element 31A has moved beyond the pair of rollers 63.1, 63.2 drawing the first ply V1 therewith. The winding roller 9.3 in the meanwhile may be displaced to the position for cooperating with the abutment roller 61. After the first anchoring element 31A transits through the nip between the rollers 63.1, 63.2, the latter may be brought one against the other, to pinch the ply V1 between them, as shown in FIG. 12C. Therefore, in this step the ply V1 is pinched in two points: between the winding roller 9.3 and the abutment roller 61, and between the two rollers 63.1, 63.2.

Figure 12D:
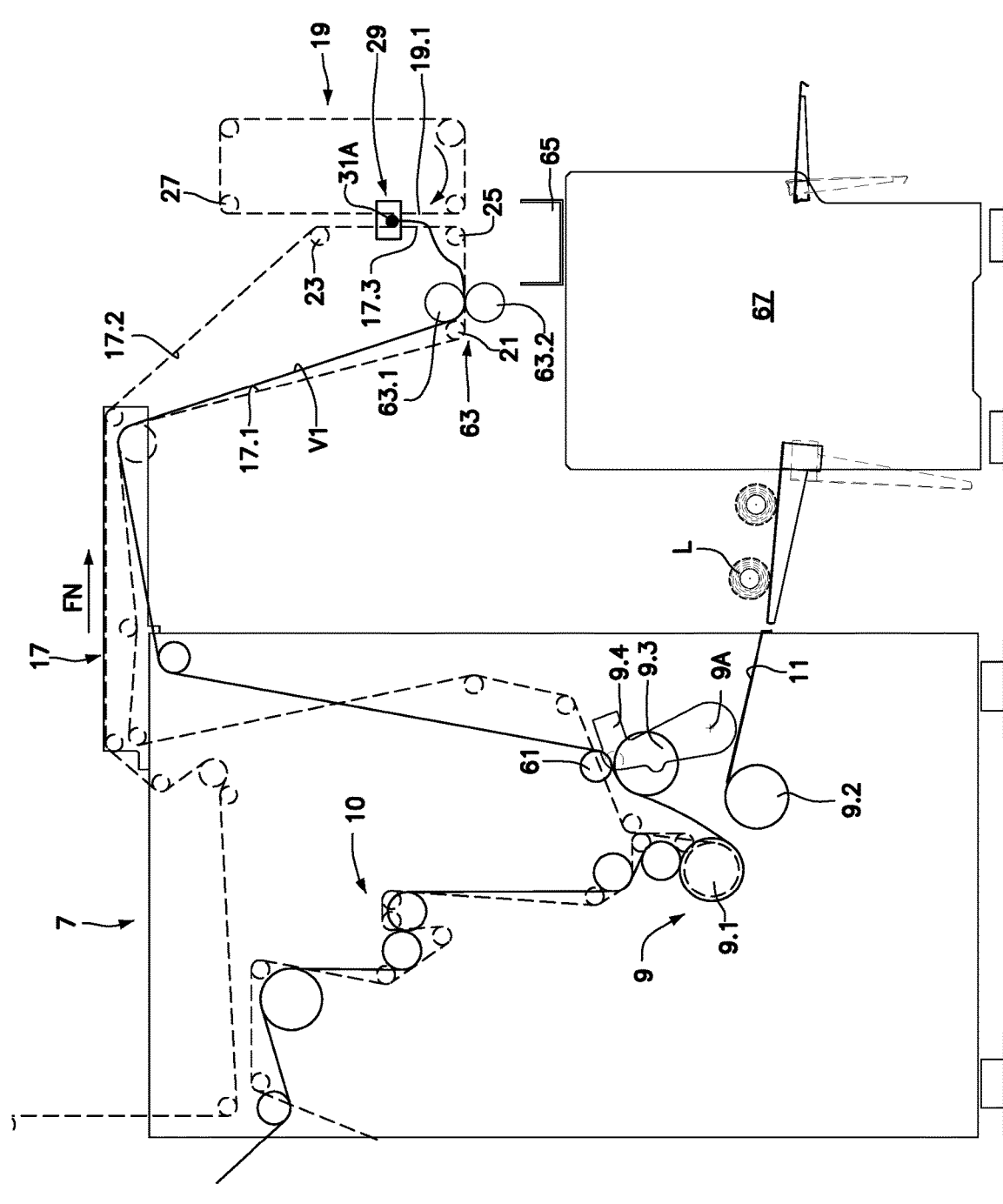
Figure 12E:
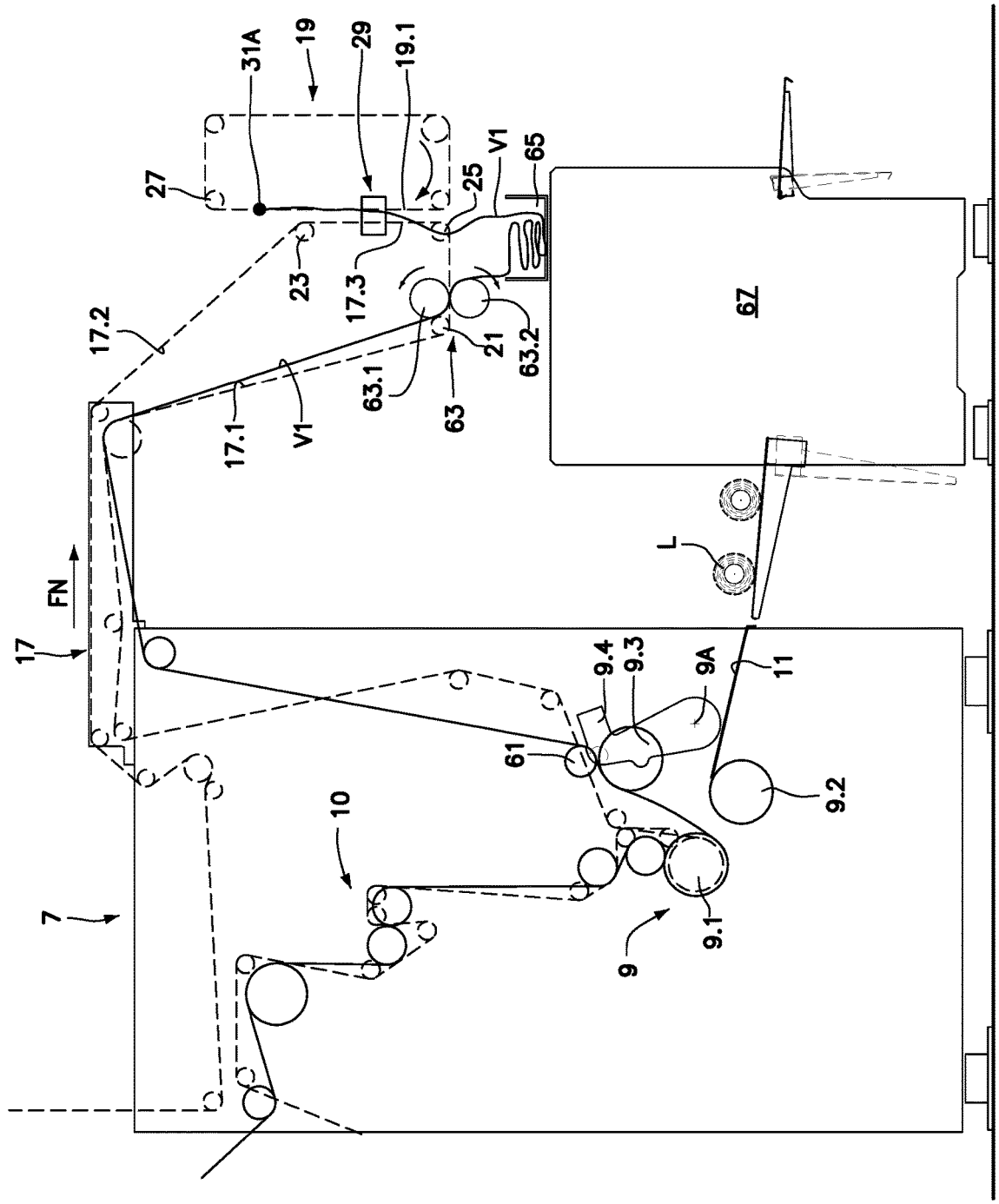

In the subsequent FIG. 12D, the first anchoring element 31A has reached the transfer position 29 and it can be transferred from the first flexible member 17 to the second flexible member 19, to advance over a given section along such flexible member until it is outside the transfer position 29 and stop here. This condition is shown in FIG. 12E: the anchoring element 31A is stationary on the second flexible member 19, which is stationary. In this step, the rollers 63.1, 63.2, in whose nip formed by them the ply V1 is pinched, rotate to advance the ply V1 towards the collection system 65. The rotary movement of the counter-rotating rollers 63.1, 63.2 is synchronised with the advancement movement of the first flexible member 17, to which a second anchoring element 31B, to which a second ply V2 is attached, still not visible in FIG. 12E, is constrained.

Figure 12F:
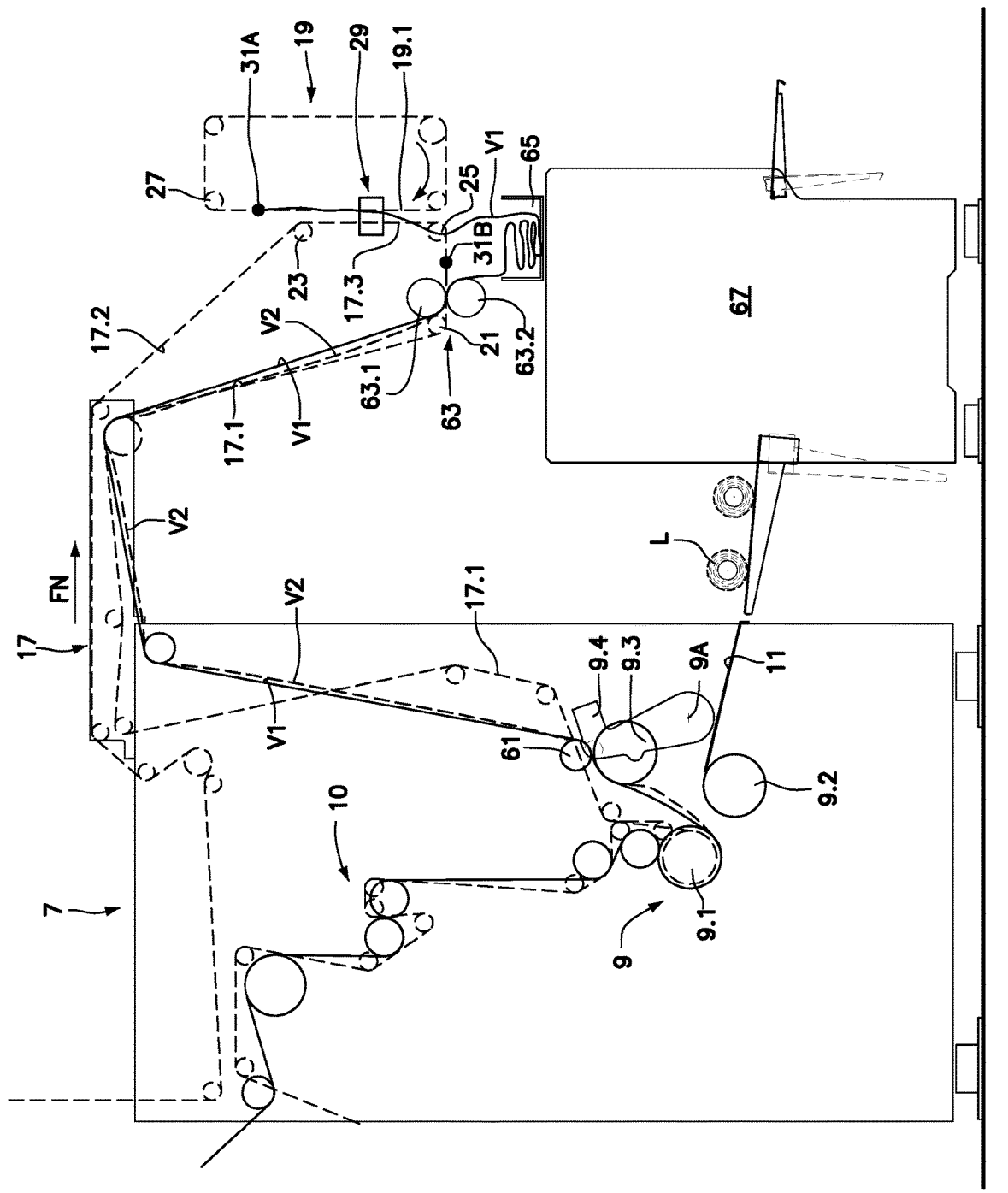

In FIG. 12F the second anchoring element 31B has moved downstream of the rollers 63.1, 63.2 drawing the leading edge of the second web V2 therewith. Along the threading path 17.1, the plies V1 and V2 are adjacent and at contact with each other and both advance towards the collection system 65 at the same speed.

Figure 12G:
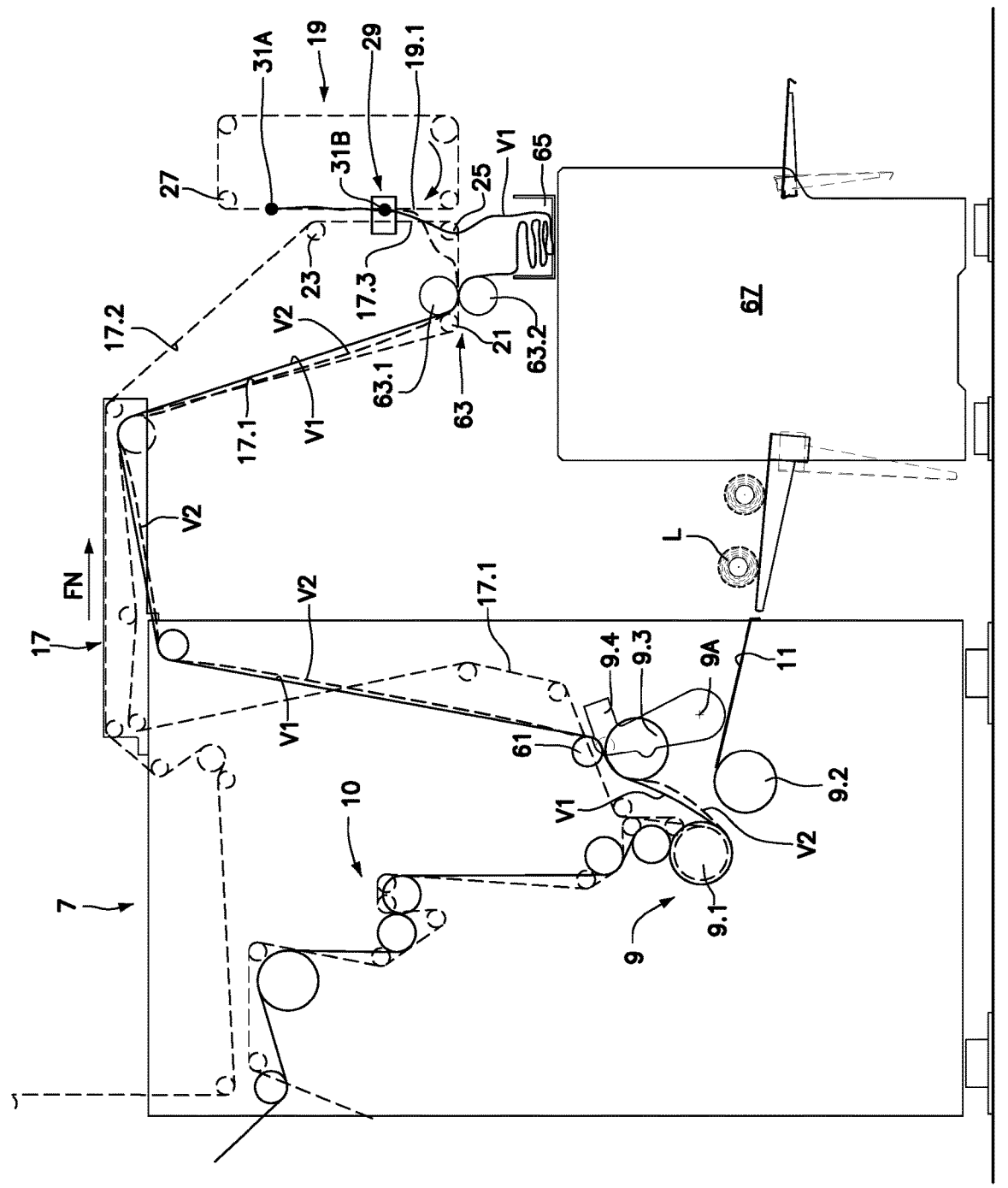
Figure 12H:
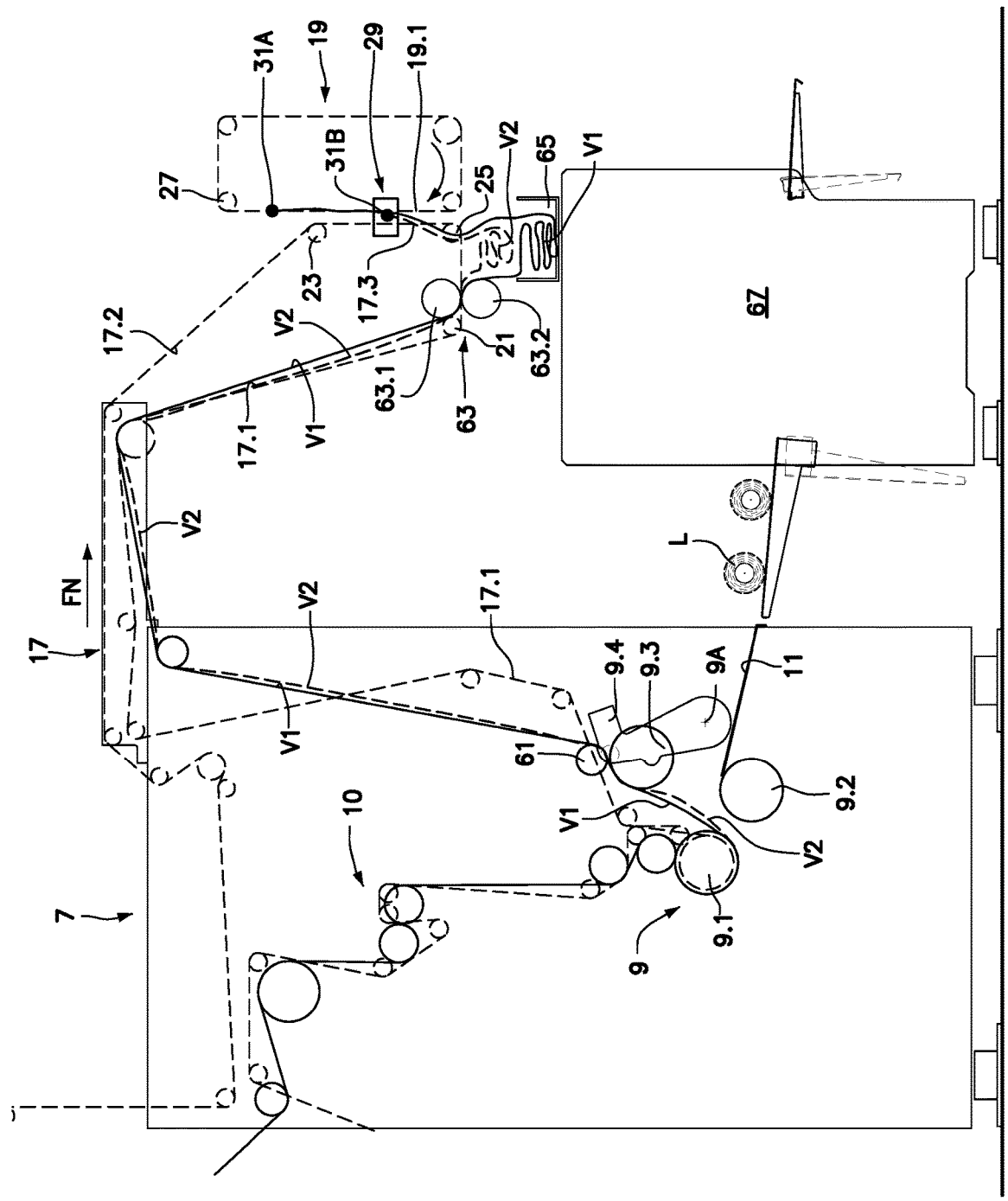

In FIG. 12G the second anchoring element 31B has reached the transfer position 29 and it is transferred, following the procedure described above, from the first flexible member 17 to the second flexible member 19. To this end, the second flexible member 19 may carry out a limited advancement movement, not visible in the figures. In another embodiment, not shown, it is possible to prevent the transfer of the anchoring element 31B from the first flexible member 17 to the second flexible member 19. In this case, the anchoring element 31B remains on the flexible members 17 in proximity of the transfer station 29.

Having reached this position, the second anchoring element 31B, the anchoring element 31A and the second flexible member 19 may remain stationary, while the first flexible member 17 continues to advance (FIG. 12A), supplying the first ply V1 and the second ply V2 in the collection system 65, until the inclined edge Bi (FIG. 5) of the second ply V2 has moved beyond the winding unit 9. Vice versa, both the first flexible member 17 and the second flexible member 19 can be held stationary and both the first ply V1 and the second ply V2 can be supplied through the pair of rollers 63.1, 63.2 and through the pair consisting of the winding roller 9.3 and the abutment roller 61.

Figure 12I:
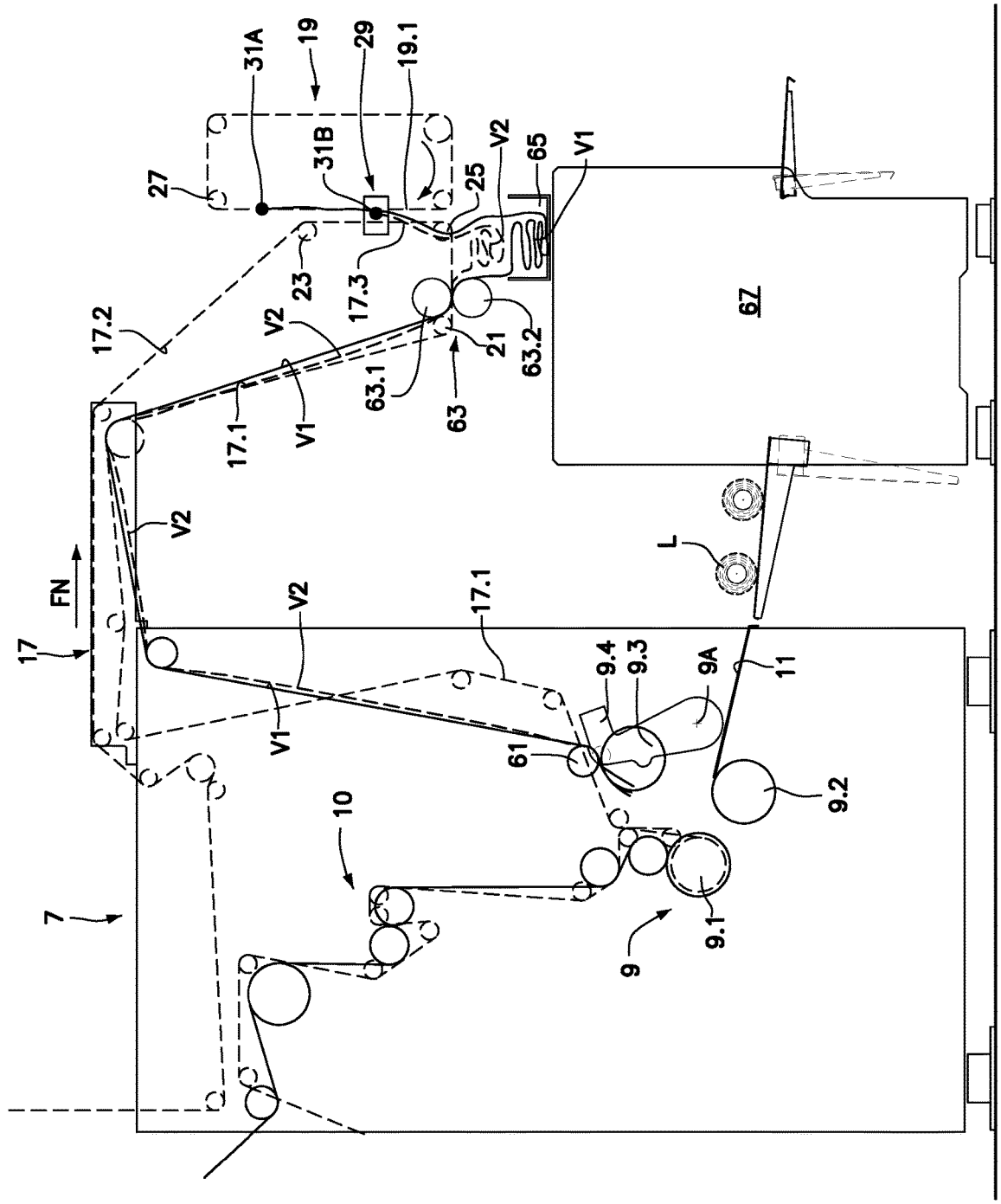
Figure 12J:
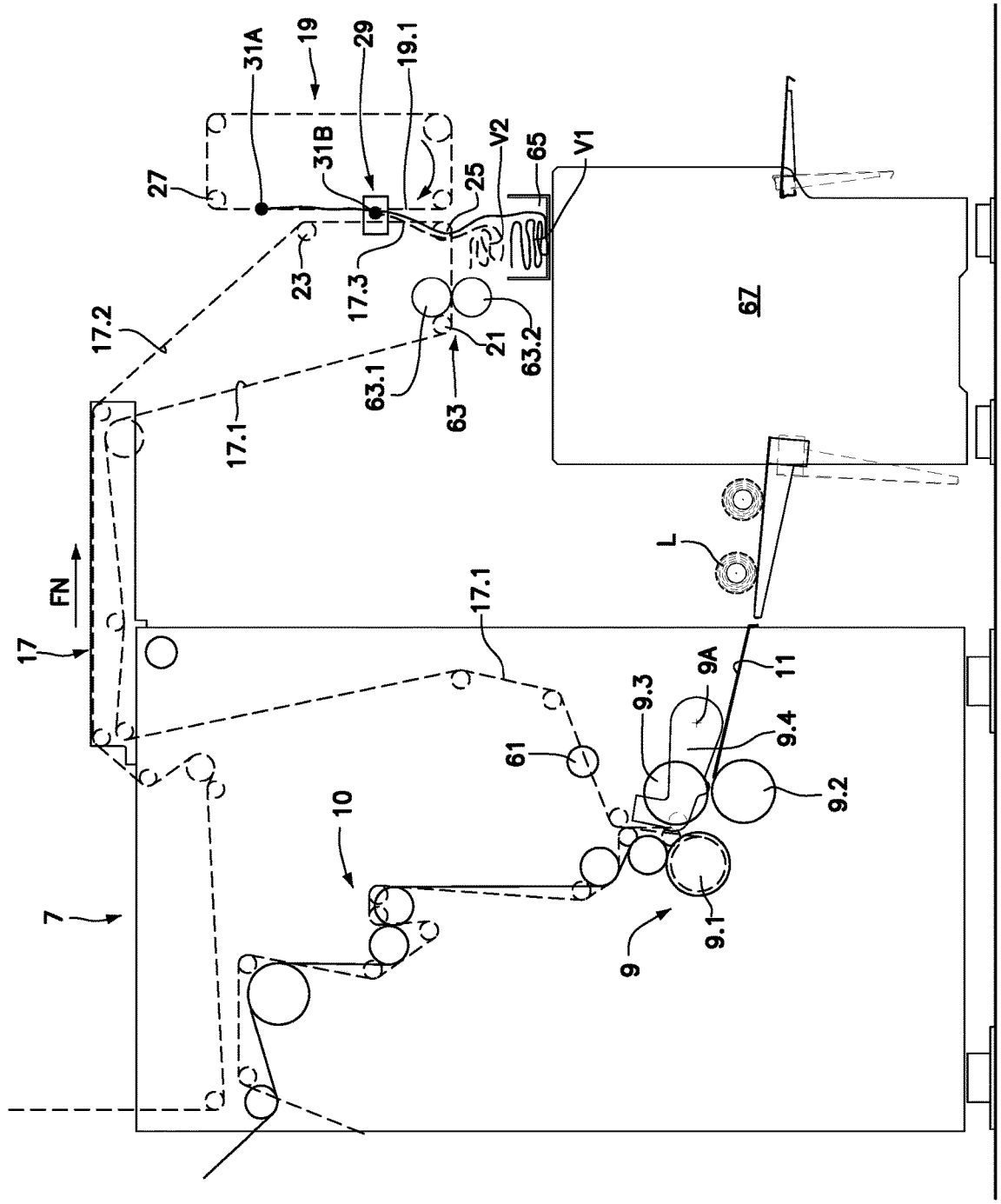

At this point, the two plies V1, V2, generally forming the web material to be wound into rolls, when they are fully laid at least on the winding roller 9.1, are severed through the severing system (not shown) with which the rewinder 7 is provided. As described above with reference to the sequence of FIGS. 4A-4H, in this step the plies V1, V2 may be stretched by means of the winding roller 9.3 co-acting with the abutment roller 61. In FIG. 12I, the plies V1, V2 have been severed forming two edges L3. The portions of the plies V1 and V2 downstream of the edges L3 are drawn by the rollers 63.1, 63.2 and unloaded into the collection system 65, see FIG. 12J.

At this point, the rewinder 7 has started to manufacture rolls or logs L, which are unloaded towards the gluing device 67, while an operator can remove the web material accumulated in the collection system 65 and recover anchoring elements, manually releasing them from the second flexible member 19 and removing therefrom the residual ply V1, V2. The recovered anchoring elements 31A, 31B are reutilized when there arises the need to carry out a new threading, moving them to the side of the inlet of the embossing-laminating machine or in any other suitable point where they are engaged to the flexible member 17 or to any other flexible member of the threading device, from which they are then transferred to the flexible member 17.

In the illustrated embodiment, the converting line 1 comprises an embossing-laminating machine 5 and the threading device may be used to thread the plies through the embossing-laminating machine as well. If such unit is not present in the line, the threading device may be used to thread the plies only through the rewinder. If other machines, for example a printing machine, are provided for upstream of the rewinder 7 the threading device may be used for inserting the plies through said further machines.

Specifically with reference to FIG. 2, described below is a method for threading two plies V1, V2 through the embossing-laminating machine. In the illustrated example, the first continuous flexible member 17 extends up to a position upstream of the embossing-laminating machine and more in particular in the inlet path of the first ply V1 in the embossing-laminating machine 5.

A third flexible member 18, configured in a manner similar to the flexible members 17 and 19, with similar shaped slots, so as to allow the transfer of the anchoring elements 31, 31A, 31B from one flexible member to the other, is associated to the embossing-laminating machine 5.

The third flexible member 18 extends upstream of the second inlet of the embossing-laminating machine 5, where the second ply V2 is inserted. At the outlet of the embossing-laminating machine 5, the two flexible members 17 and 18 have respective portions arranged side by side with respect to each other in a transfer position 30, where an anchoring element 31B is transferred from the third flexible member 18 to the first flexible member 17 for the purposes set out below. Arranged in the transfer position 30 is a transfer device 52, which can be configured as the transfer device 51 described above.

With the arrangement described and illustrated in FIG. 2 the two plies V1, V2 can be threaded in the embossing-laminating machine 5 as follows. The operator may attach the anchoring element 31A to the flexible member 17 upstream of the embossing-laminating machine 5 and fix the leading edge of the ply V1 thereto. Furthermore, the operator may attach the second anchoring element 31B to the third flexible member 18 upstream of the embossing-laminating machine 5. By advancing the flexible members 17, 18 along the respective threading paths, it is then possible to bring the two leading edges of the plies V1, V2 between the two embossing rollers 5.1, 5.2 (FIG. 2) and beyond the nip defined between the embossing roller 5.1 and a respective pressure roller 5.3, in the transfer position 30. Here, the anchoring element 31B may be transferred from the third flexible member 18 to the first flexible member 17 with a process equivalent to the one illustrated in FIGS. 9A-9E and described above. The transfer is carried out in a manner such that the two anchoring elements 31A, 31B are on the first flexible member 17 at a distance appropriate to subsequently perform the previously described threading operations in the rewinding machine 7. The possibility of transferring the anchoring element 31B in the transfer station 29 so as to superimpose the two anchoring elements 31A, 31B on the first flexible member 17 facilitating the threading of the plies V1 and V2 in the processing stations downstream of the embossing-laminating machine 5 cannot be ruled out.

A configuration in which the first continuous flexible member 17 extends from a position upstream of the embossing-laminating machine 5 to a position downstream of the winding unit 9 of the rewinder 7 is illustrated in FIG. 5. However, though currently preferred, this is not the only way for performing the threading. For example, it is possible to provide for that the plies V1 and V2 be inserted into the embossing-laminating machine 5 by means of two respective continuous flexible members, which separately insert the ply V1 and the ply V2 in the embossing-laminating machine 5, and from which the anchoring elements are then transferred to the continuous flexible members 17, which in this case extends from a position downstream of the embossing-laminating machine 5 up to the position downstream of the winding unit 9 of the rewinder 7.

The described threading system is effective even in case more than two plies are to be threaded, each with a different path at least up to the outlet of the embossing-laminating machine 5, or in case the embossing-laminating machine 5 is settable for manufacturing different products that entail different types of plies. In this case there arises the need to have several flexible members which can thread the individual plies in a suitable manner with respect to the desired product and one or more transfer stations 29 to transfer the anchoring elements from one flexible member to the other to thread the plies along the desired path or paths. In this manner, starting from a recipe which can be selected from an operator's panel normally present in a converting line, the plies required to form the web material N can be threaded automatically along the pre-established paths without the action of an operator.

The described system allows to carry out threading operations rapidly and safely, reducing manual actions and the need for the operator to access hazardous areas of the machine forming the converting line 1 to the minimum.

Some specific aspects of the machine, of the converting line and of the method according to the present invention are defined in the clauses below:

Clause 1. A machine for processing a web material, comprising: a web material advancement path and a threading device adapted to introduce a leading edge of the web material into the web material advancement path; wherein the threading device comprises:

a first continuous flexible member defining: a threading path from an upstream position to a downstream position with respect to the web material threading direction; and a return path;

a second flexible member;

at least one web material anchoring element, which is adapted to be reversibly constrained alternately to the first flexible member and to the second flexible member; and a device for transferring the anchoring element from the first flexible member to the second flexible member, arranged in a transfer position along a portion of the path of the first flexible member, in said position the first flexible member being adjacent to the second flexible member.

Clause 2. The machine of clause 1, wherein the second flexible member is a continuous flexible member.

Clause 3. The machine of clause 1 or 2, wherein the anchoring element comprises at least one coupling member adapted to reversibly couple the anchoring element alternately to the first flexible member and to the second flexible member.

Clause 4. The machine of one or more of the preceding clauses, wherein the anchoring element comprises a sheet, with a first face and a second face, from which the coupling member projects.

Clause 5. The machine of one or more of the preceding clauses, wherein the coupling member comprises at least one stem and preferably two stems, each having two end expansions positioned on two opposite sides of the anchoring element, adapted to be engaged in shaped slots of the first flexible member and of the second flexible member.

Clause 6. The machine of one or more of the preceding clauses, wherein the sheet comprises a slot adapted to engage the leading edge of the web material.

Clause 7. The machine of one or more of the preceding clauses wherein said machine is a rewinding machine comprising a winding unit arranged along the threading path upstream of the transfer position.

Clause 8. The machine of clause 7, wherein the transfer position is arranged outside the rewinder.

Clause 9. The machine of one or more of the preceding clauses, wherein associated with the threading path is a system for collecting an initial portion of the web material threaded along the machine; wherein the collecting system can be arranged along the path of the first flexible member, between the winding unit and the transfer position.

Clause 10. The machine of one or more of the preceding clauses, comprising a web material severing device.

Clause 11. The machine of clause 10, wherein the web material severing device is arranged between the winding unit and the transfer position.

Clause 12. The machine of one or more of the preceding clauses, wherein the web material severing device comprises a web material pinching device.

Clause 13. The machine of clause 12, wherein the pinching device comprises a pair of counter-rotating members forming a nip adapted to pinch the web material.

Clause 14. The machine of clause 13, wherein the web material severing device comprises members for forming a web material pre-breaking line, and wherein the severing device is adapted to stretch the web material, preferably between the web material severing device and the anchoring element.

Clause 15. The machine of one or more of the preceding clauses, comprising a device for removing the initial portion of the web material, arranged between the winding unit and the severing device and to transfer said web material in the collection system; wherein said removal device may consist of the web material severing device or comprise the web material severing device.

Clause 16. The machine of one or more of the preceding clauses, wherein arranged between the winding unit and the severing device is a web material stretching member.

Clause 17. The machine of clause 16, wherein the stretching member, preferably an abutment roller, co-acting with one of the winding rollers of the winding unit, preferably a winding roller with a movable axis, the winding roller and the abutment element being adapted to form a web material pinching nip.

Clause 18. The machine of one or more of the preceding clauses, wherein arranged along the path of the first flexible member, between the winding unit and the transfer position, is a web material drawing device, preferably comprising a pair of counter-rotating rollers defining a web material pinching and drawing nip, is preferably adapted to dispense the web material into the collection system.

Clause 19. The machine of one or more of the preceding clauses, comprising a first path for a first ply of the web material and a second path for a second ply of the web material, wherein the first flexible member extends at least partly along the first path and the second flexible member extends at least partly along the second path; wherein the first path and the second path converge towards the transfer position.

Clause 20. The machine of clause 19, wherein the machine is an embossing-laminating machine.

Clause 21. A web material converting line, comprising a rewinding machine according to one or more of the preceding clauses and, upstream of the rewinding machine, a further machine comprising: a first inlet for a first ply of the web material, a second inlet for a second ply of the web material; an outlet for the first ply and the second ply; wherein the first continuous flexible member extends from the first inlet of the further machine towards the rewinder; wherein a third flexible member extends from the second inlet to the outlet of the further machine; and wherein, arranged at the outlet of the further machine is a further device for transferring the anchoring element from the third flexible member to the first flexible member, said further device positioned in a second transfer position along a portion of the path of the first flexible member, in the transfer position the first flexible member being arranged adjacent to the third flexible member.

Clause 22. A web material converting line, comprising a rewinding machine according to one or more of the preceding clauses and, upstream of the rewinding machine, a further machine comprising: a first inlet for a first ply of the web material, a second inlet for a second ply of the web material; an outlet for the first ply and the second ply; wherein a third flexible member extends from the second inlet to the outlet of the further machine; wherein a fourth flexible member extends from the first inlet of the further machine towards the rewinding machine; wherein arranged at the outlet of the further machine is a second device for transferring the anchoring element from the third flexible member to the fourth flexible member, the second device positioned in a second transfer position along a portion of the path of the fourth flexible member, in the second transfer position the fourth flexible member being adjacent to the third flexible member; and wherein arranged between the outlet of the further machine and the winding unit of the rewinder is a third device for transferring the anchoring element from the fourth flexible member to the first flexible member, positioned in a third transfer position along a portion of the path of the fourth flexible member, in the third transfer position the fourth flexible member being adjacent to the first flexible member.

Clause 23. The line of clause 21 or 22, wherein the further machine comprises an embossing-laminating machine.

Clause 24. A method for threading a web material in a web material converting machine, comprising the following steps:

engaging a leading edge of a web material to an anchoring element which is adapted to be reversibly constrained to a first continuous flexible member, wherein the first continuous flexible member defines a threading path from a first upstream position to a second downstream position with respect to a web material advancement direction in the machine, and a return path;

inserting the leading edge of the web material along the threading path, through the machine up to the second downstream position;

transferring the anchoring element, with the web material anchored thereto, from the first flexible member to a second flexible member, in a transfer position, in said transfer position a portion of the path of the first flexible member being arranged adjacent to a path of the second flexible member.

Clause 25. The method of clause 24, wherein the machine is a rewinding machine comprising a winding unit, and wherein the second position is arranged downstream of the winding unit with respect to the advancement direction of the web material in the threading path.

Clause 26. The method of clause 25, further comprising the step of severing the web material to start winding of a roll in the winding unit.

Clause 27. The method of clause 26, wherein the step of severing the first ply is carried out by stretching the web material between the anchoring element and a pinching member arranged between the winding unit and the transfer position.

Clause 28. The method of one or more of clauses 24 to 27, comprising the step of advancing the web material by means of a drawing device, keeping the anchoring element, transferred onto the second flexible element, in a substantially stationary position.

Clause 29. The method of one or more of clauses 24 to 28, comprising the step of collecting an initial portion of the web material in a collection system, arranged upstream of the transfer position.

Clause 30. The method of one or more of clauses 25 to 29, wherein the step of severing the web material comprises the steps of:
weakening the web material along a transversal pre-breaking line; and
stretching web material until it breaks along the pre-break transverse line.

Clause 31. The method of one or more of clauses to 24 to 30, wherein the web material comprises at least a first ply, and wherein the method further comprises the following steps:
engaging a leading edge of a second ply of the web material to a second anchoring element which is adapted to be reversibly constrained to the first flexible member; and
keeping the leading edge of the first ply engaged with the second flexible member in a substantially stationary position, advancing the leading edge of the second ply along the threading path up to the transfer position moving the second anchoring element by means of the first flexible member, to which the second anchoring element is constrained.

Clause 32. The method of one or more of clauses 24 to 31, wherein the web material is stretched between the winding unit and an abutment element, arranged along the path of the first flexible member, between the winding unit and the transfer position.

Clause 33. The method of clause 32, wherein the web material is stretched by pinching it between the abutment element and a winding roller of the winding unit.

Clause 34. The method of one or more of clauses 24 to 33, wherein the transfer position is arranged outside the rewinder.

Clause 35. The method of clause 24, wherein the machine comprises a first path for the web material, said web material comprising at least a first ply, and a second path for a second ply of the web material, wherein the first path and the second path for the first ply and for the second ply of the web material converge towards the transfer position; and wherein the method further comprises the following steps:
engaging a leading edge of the second ply to a further anchoring element which is adapted to be reversibly constrained to the second flexible member, wherein the second flexible member is a continuous flexible member and defines a second threading path and a return path, the second threading path following the path for the second ply of the web material; and
inserting the leading edge of the second ply along the second threading path, through the machine up to the transfer position;

Clause 36. A method for threading two plies of web material in a converting machine, preferably an embossing-laminating machine comprising the following steps:
engaging a leading edge of a first ply of web material to a first anchoring element which is adapted to be reversibly constrained to a first flexible member, said first flexible member defining a threading path from a first inlet of the machine to an outlet of the machine;
threading the leading edge of the first ply of web material from the first inlet to the outlet of the machine through the first anchoring element constrained to the first flexible member;
engaging a leading edge of a second ply of web material to a further anchoring element, which is adapted to be reversibly constrained to a further flexible member, said further flexible member defining a threading path from a second inlet of the machine to an outlet of the machine;
threading the leading edge of the second ply of web material from the second inlet to the outlet through the further anchoring element constrained to the further flexible member;
transferring the further anchoring element from the further flexible member to the first flexible member; and
through the first flexible member, transferring the anchoring element and the further anchoring element, with the first ply and the second ply constrained thereto, towards a station downstream of the machine.

Clause 37. A method for threading a web material in a rewinder comprising a winding unit, the method comprising the following steps:
engaging a leading edge of a first ply of web material to an anchoring element which is adapted to be reversibly constrained to a first continuous flexible member, wherein the continuous flexible member defines a threading path from an inlet of the rewinder up to a position downstream of the winding unit, with respect to the web material threading direction, and a return path;
inserting the leading edge of the first ply along the threading path, through a winding unit, up to a transfer position moving the anchoring element through the first flexible member;

transferring the anchoring element, with the first ply anchored thereto, from the first flexible member to a second flexible member, in a transfer position, in which a portion of the path of the first flexible member is arranged adjacent to a path of the second flexible member; and severing the first ply of web material to start the winding of a roll in the winding unit.

Clause 38. The method of clause 37, wherein the web material comprises at least a second ply, and wherein the method further comprises the following steps: keeping the leading edge of the first ply engaged with the second flexible member in a substantially stationary position, advancing the leading edge of the second ply along the threading path up to the transfer position moving the second anchoring element by means of the first flexible member, to which the second anchoring element is constrained.

Clause 39. The method of clause 37, comprising one or more of the features of clauses 24 to 34.

The invention claimed is:

1. A machine for converting a web material, comprising: a web material advancement path and a threading device adapted to introduce a leading edge of a web material into the web material advancement path; wherein the threading device comprises:
   a first flexible member which is continuous and defines a threading path from an upstream position to a downstream position with respect to a threading direction for the web material, and a return path;
   a second flexible member;
   at least one web material anchoring element, adapted to be reversibly constrained alternately to the first flexible member and to the second flexible member; and
   a device for transferring the at least one web material anchoring element from the first flexible member to the second flexible member, arranged in a transfer position along a portion of the threading path of the first flexible member, in the transfer position the first flexible member being adjacent to the second flexible member.

2. The machine of claim 1, wherein the second flexible member is a continuous flexible member.

3. The machine of claim 1, wherein the at least one web material anchoring element comprises at least one coupling member adapted to reversibly couple the at least one web material anchoring element alternately to the first flexible member and to the second flexible member.

4. The machine of claim 3, wherein the at least one web material anchoring element comprises a sheet with a first face and a second face, from which the at least one coupling member projects.

5. The machine of claim 1, configured as a rewinding machine comprising a winding unit arranged along the threading path upstream of the transfer position.

6. The machine of claim 5, wherein the transfer position is arranged outside the rewinding machine.

7. The machine of claim 5, wherein associated with the threading path is a system for collecting an initial portion of the web material threaded along the machine; and wherein the collection system is arranged between the winding unit and the transfer position.

8. The machine of claim 5, further comprising a web material severing device.

9. The machine of claim 8, wherein the web material severing device is arranged between the winding unit and the transfer position.

10. The machine of claim 9, wherein the web material severing device comprises a pair of counter-rotating members forming a nip adapted to pinch the web material; and members for forming a web material pre-breaking line; and wherein the web material severing device is adapted to stretch the web material between the web material severing device and the at least one web material anchoring element.

11. The machine of claim 8, wherein the web material severing device is adapted to remove an initial portion of the web material between the winding unit and the web material severing device and to transfer the initial portion to the collection system.

12. The machine of claim 8, wherein arranged between the winding unit and the web material severing device is a web material stretching member comprising an abutment element co-acting with a winding roller of the winding unit, the winding roller and the abutment element being adapted to form a web material pinching nip.

13. The machine of claim 5, wherein arranged along the threading path of the first flexible member, between the winding unit and the transfer position, a web material drawing device is arranged, the web material drawing device comprising a pair of counter-rotating rollers defining a web material pinching and drawing nip.

14. The machine of claim 1, further comprising a first path for a first ply and a second path for a second ply of the web material, wherein the first flexible member extends at least partly along the first path and the second flexible member extends at least partly along the second path, and wherein the first path and the second path converge towards the transfer position.

15. The machine of claim 14, configured as an embossing-laminating machine.

16. The machine of claim 1, wherein associated to the at least one web material anchoring element is at least one stretching sensor for detecting a tensile stress exerted by a ply anchored to the at least one web material anchoring element during threading.

17. A web material converting line, comprising:
   a rewinding machine comprising:
      a web material advancement path and a threading device adapted to introduce a leading edge of a web material into the web material advancement path; wherein the threading device comprises:
      a first flexible member which is continuous and defines a threading path from an upstream position to a downstream position with respect to the web material threading direction, and a return path;
      a second flexible member;
      at least one web material anchoring element, adapted to be reversibly constrained alternately to the first flexible member and to the second flexible member;
      a device for transferring the at least one web material anchoring element from the first flexible member to the second flexible member, arranged in a transfer position along a portion of the threading path of the first flexible member, in the transfer position the first flexible member being adjacent to the second flexible member;
      a winding unit arranged along the threading path upstream of the transfer position; and
   an embossing-laminating machine arranged upstream of the rewinding machine;
   wherein the embossing-laminating machine comprises a first inlet for a first ply of the web material, a second inlet for a second ply of the web material; an outlet for the first ply and the second ply; wherein the first flexible member extends from the first inlet of the embossing-laminating machine towards the rewinding machine; wherein a third flexible member extends from the second inlet to the outlet of the embossing-laminating machine; and wherein, arranged at the outlet of the embossing-laminating machine is a further device for transferring the at least one web material anchoring element from the third flexible member to the first flexible member, positioned in a second transfer position along a portion of the threading path of the first flexible member, in the second transfer position the first flexible member being arranged adjacent to the third flexible member.

18. A web material converting line, comprising:

a rewinding machine comprising:

a web material advancement path and a threading device adapted to introduce a leading edge of the web material into the web material advancement path;

wherein the threading device comprises:

a first flexible member which is continuous and defines a threading path from an upstream position to a downstream position with respect to a web material threading direction, and a return path;

a second flexible member;

at least one web material anchoring element, adapted to be reversibly constrained alternately to the first flexible member and to the second flexible member;

a device for transferring the at least one web material anchoring element from the first flexible member to the second flexible member, arranged in a transfer position along a portion of the threading path of the first flexible member, in the transfer position the first flexible member being adjacent to the second flexible member;

a winding unit arranged along the threading path upstream of the transfer position; and an embossing-laminating machine upstream of the rewinding machine;

wherein the embossing-laminating machine comprises a first inlet for a first ply of the web material, a second inlet for a second ply of the web material, an outlet for the first ply and the second ply; wherein a third flexible member extends from the second inlet to the outlet of the embossing-laminating machine; wherein a fourth flexible member extends from the first inlet of the embossing-laminating machine towards the rewinding machine; wherein arranged at the outlet of the embossing-laminating machine is a second device for transferring the at least one web material anchoring element from the third flexible member to the fourth flexible member, positioned in a second transfer position along a portion of the path of the fourth flexible member, in the second transfer position the fourth flexible member being adjacent to the third flexible member; and wherein arranged between the outlet of the embossing-laminating machine and the winding unit of the rewinding machine is a third device for transferring the at least one web material anchoring element from the fourth flexible member to the first flexible member, positioned in a third transfer position along a portion of the path of the fourth flexible member, in the third transfer position the fourth flexible member being adjacent to the first flexible member.

19. A method for threading a web material in a web material converting machine, comprising:

engaging a leading edge of a web material to an anchoring element which is adapted to be constrained to a first continuous flexible member, wherein the first continuous flexible member defines a threading path from a first upstream position to a second downstream position with respect to a web material advancement direction in the machine, and a return path;

inserting a leading edge of the web material along the threading path, through the machine up to the second downstream position;

transferring the anchoring element, with the web material anchored thereto, from the first continuous flexible member to a second flexible member, in a transfer position, in the transfer position a portion of the path of the first continuous flexible member being arranged adjacent to a path of the second flexible member.

20. The method of claim 19, wherein the machine is a rewinding machine comprising a winding unit; wherein the second position is arranged downstream of the winding unit with respect to the web material advancement direction in the threading path; and wherein the method further comprises severing the web material to start winding of a roll in the winding unit.

21. The method of claim 20, further comprising collecting an initial portion of the web material in a collection system, arranged upstream of the transfer position, and arranged outside the rewinding machine.

22. The method of claim 20, further comprising advancing the web material by a drawing device, keeping the anchoring element transferred onto the second flexible element in a substantially stationary position.

23. The method of claim 20, wherein said severing of the first ply is carried out by stretching the web material between the anchoring element and a pinching member arranged between the winding unit and the transfer position.

24. The method of claim 19, wherein said severing of the web material comprises:

weakening the web material along a transverse pre-breaking line; and stretching the web material until the web material breaks along the transverse pre-breaking line.

25. The method of claim 20, wherein the web material comprises at least a first ply and a second ply, and wherein the method further comprises:

engaging the leading edge of a second ply of the web material to a second anchoring element adapted to be reversibly constrained to the first flexible member; and keeping a leading edge of the first ply substantially stationary and engaged with the second flexible member by the first anchoring element, advancing the leading edge of the second ply along the threading path up to the transfer position moving the second anchoring element by the first flexible member.

26. The method of claim 19, wherein the web material is stretched between the winding unit and an abutment element, arranged along the path of the first flexible member, between the winding unit and the transfer position; and wherein the web material is stretched by pinching between the abutment element and a winding roller of the winding unit.

27. The method of claim 19, wherein the machine further comprises a first path for the web material, said web material comprising at least a first ply and a second ply, and a second path for the second ply of the web material, wherein the first path and the second path for the first ply and the second ply of the web material converge towards the transfer position; and wherein the method further comprises:

engaging a leading edge of the second ply to a further anchoring element adapted to be reversibly constrained to the second flexible member, wherein the second flexible member is a continuous flexible member and defines a second threading path and a second return path, the second threading path following the path for the second ply of the web material;

inserting the leading edge of the second ply along the second threading path, through the machine up to the transfer position.

* * * * *